US009056463B2

(12) United States Patent
Sasayama

(10) Patent No.: US 9,056,463 B2
(45) Date of Patent: Jun. 16, 2015

(54) IMAGE RECORDING APPARATUS, IMAGE PROCESSING APPARATUS, IMAGE RECORDING METHOD AND IMAGE PROCESSING METHOD, AND RECORDING MEDIUM

(71) Applicant: FUJIFILM CORPORATION, Tokyo (JP)

(72) Inventor: Hiroyuki Sasayama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 315 days.

(21) Appl. No.: 13/756,287

(22) Filed: Jan. 31, 2013

(65) Prior Publication Data
US 2013/0201234 A1 Aug. 8, 2013

(30) Foreign Application Priority Data

Feb. 2, 2012 (JP) .................................. 2012-020805

(51) Int. Cl.
*B41J 2/125* (2006.01)
*B41J 2/21* (2006.01)
(52) U.S. Cl.
CPC ................ *B41J 2/125* (2013.01); *B41J 2/2142* (2013.01); *B41J 2/2146* (2013.01)
(58) Field of Classification Search
CPC ...... B41J 2/125; B41J 2/16552; B41J 2/1657; B41J 29/38
USPC .......................................................... 347/12
See application file for complete search history.

(56) References Cited

U.S. PATENT DOCUMENTS

| 5,276,467 | A | * | 1/1994 | Meyer et al. | 347/19 |
| 5,576,744 | A | * | 11/1996 | Niikura et al. | 347/14 |
| 5,617,122 | A | * | 4/1997 | Numata et al. | 347/14 |
| 6,126,341 | A | * | 10/2000 | Tanaka et al. | 400/74 |
| 6,359,701 | B1 | * | 3/2002 | Yamada et al. | 358/1.2 |
| 6,918,644 | B2 | * | 7/2005 | Aruga | 347/9 |
| 7,021,734 | B2 | * | 4/2006 | Lee | 347/12 |
| 7,168,775 | B2 | * | 1/2007 | Kuruma et al. | 347/14 |
| 7,175,249 | B2 | * | 2/2007 | Hongo et al. | 347/19 |
| 7,289,246 | B2 | * | 10/2007 | Takahashi et al. | 358/1.9 |
| 7,306,306 | B2 | * | 12/2007 | Katsu et al. | 347/5 |
| 7,327,503 | B2 | | 2/2008 | Yashima et al. | |
| 7,370,927 | B2 | * | 5/2008 | Kuruma et al. | 347/14 |

(Continued)

FOREIGN PATENT DOCUMENTS

JP 2003-136764 A 5/2003

*Primary Examiner* — Alessandro Amari
*Assistant Examiner* — Alexander C Witkowski
(74) *Attorney, Agent, or Firm* — Studebaker & Brackett PC

(57) ABSTRACT

According to the present invention, recording density information indicating a recording density of a plurality of recording elements is acquired on the basis of a test chart for density measurement output to a recording medium after carrying out recording defect correction in respect of existing recording elements having a recording defect, recording elements which record in the periphery of a new recording element having a recording defect are extracted as correction hold recording elements on the basis of a test chart for recording defect detection output to the recording medium, predetermined density correction values are set in respect of the correction hold recording elements, density correction values calculated on the basis of the acquired recording density information are set in respect of recording elements other than the correction hold recording elements, and output image data is output to the recording medium on the basis of the set density correction values.

15 Claims, 16 Drawing Sheets

(56) References Cited

U.S. PATENT DOCUMENTS

| | | | |
|---|---|---|---|
| 7,401,882 B2* | 7/2008 | Umezawa | 347/19 |
| 7,543,904 B2* | 6/2009 | Izuo | 347/19 |
| 7,699,416 B2* | 4/2010 | Imai | 347/5 |
| 7,780,257 B2* | 8/2010 | Hongo et al. | 347/19 |
| 7,828,402 B2* | 11/2010 | Otsuka | 347/10 |
| 7,845,757 B2* | 12/2010 | Nishiyama | 347/23 |
| 7,850,268 B2* | 12/2010 | Katsu | 347/14 |
| 7,950,761 B2* | 5/2011 | Komatsu et al. | 347/11 |
| 8,033,634 B2* | 10/2011 | Komatsu et al. | 347/19 |
| 8,068,253 B2* | 11/2011 | Hamamoto | 358/1.8 |
| 8,104,860 B2* | 1/2012 | Ito | 347/19 |
| 8,147,028 B2* | 4/2012 | Ito | 347/23 |
| 8,157,345 B2* | 4/2012 | Sasayama | 347/19 |
| 8,177,315 B2* | 5/2012 | Endo et al. | 347/14 |
| 8,256,870 B2* | 9/2012 | Sasayama | 347/19 |
| 8,317,283 B2* | 11/2012 | Makuta et al. | 347/9 |
| 8,322,814 B2* | 12/2012 | Hirato et al. | 347/19 |
| 8,482,822 B2* | 7/2013 | Sasayama | 358/504 |
| 8,534,788 B2* | 9/2013 | Masada et al. | 347/12 |
| 8,544,979 B2* | 10/2013 | Hoki | 347/19 |
| 8,550,582 B2* | 10/2013 | Miura et al. | 347/9 |
| 8,556,362 B2* | 10/2013 | Nagamura et al. | 347/9 |
| 8,564,827 B2* | 10/2013 | Miura et al. | 358/1.8 |
| 8,567,896 B2* | 10/2013 | Ueshima | 347/19 |
| 8,628,164 B2* | 1/2014 | Murase et al. | 347/19 |
| 8,628,165 B2* | 1/2014 | Ito | 347/19 |
| 8,777,361 B2* | 7/2014 | Tamagawa | 347/15 |
| 8,888,217 B2* | 11/2014 | Nishikawa et al. | 347/10 |
| 2003/0142158 A1* | 7/2003 | Lee | 347/12 |
| 2004/0196319 A1* | 10/2004 | Aruga | 347/9 |
| 2004/0246509 A1* | 12/2004 | Hongo et al. | 358/1.6 |
| 2005/0007404 A1* | 1/2005 | Usui | 347/14 |
| 2005/0046652 A1* | 3/2005 | Kuruma et al. | 347/14 |
| 2005/0190213 A1* | 9/2005 | Katsu et al. | 347/5 |
| 2006/0192807 A1* | 8/2006 | Umezawa | 347/19 |
| 2006/0197793 A1* | 9/2006 | Takahashi et al. | 347/15 |
| 2006/0290720 A1* | 12/2006 | Katsu | 347/5 |
| 2007/0008555 A1* | 1/2007 | Hamamoto | 358/1.8 |
| 2007/0046708 A1* | 3/2007 | Kuruma et al. | 347/14 |
| 2007/0115315 A1* | 5/2007 | Hongo et al. | 347/19 |
| 2007/0139461 A1* | 6/2007 | Izuo | 347/19 |
| 2007/0229565 A1* | 10/2007 | Imai | 347/16 |
| 2008/0198191 A1* | 8/2008 | Oshima et al. | 347/10 |
| 2008/0238963 A1* | 10/2008 | Otsuka | 347/10 |
| 2009/0058920 A1* | 3/2009 | Endo et al. | 347/19 |
| 2009/0066741 A1* | 3/2009 | Komatsu et al. | 347/11 |
| 2009/0073208 A1* | 3/2009 | Komatsu et al. | 347/11 |
| 2009/0085952 A1* | 4/2009 | Yamazaki | 347/19 |
| 2009/0085953 A1* | 4/2009 | Ito | 347/19 |
| 2009/0195583 A1* | 8/2009 | Nishiyama | 347/14 |
| 2009/0213168 A1* | 8/2009 | Ito | 347/19 |
| 2009/0225125 A1* | 9/2009 | Hoki | 347/19 |
| 2010/0165022 A1* | 7/2010 | Makuta et al. | 347/9 |
| 2010/0177134 A1* | 7/2010 | Heo | 347/14 |
| 2010/0207983 A1* | 8/2010 | Sasayama | 347/14 |
| 2010/0214347 A1* | 8/2010 | Sasayama | 347/19 |
| 2010/0220365 A1* | 9/2010 | Sasayama | 358/448 |
| 2011/0084996 A1* | 4/2011 | Hirato et al. | 347/10 |
| 2011/0141169 A1* | 6/2011 | Nagamura et al. | 347/9 |
| 2011/0175962 A1* | 7/2011 | Miura et al. | 347/19 |
| 2011/0181642 A1* | 7/2011 | Miura et al. | 347/9 |
| 2011/0187775 A1* | 8/2011 | Masada et al. | 347/12 |
| 2012/0050377 A1* | 3/2012 | Ueshima | 347/19 |
| 2012/0062643 A1* | 3/2012 | Ito | 347/19 |
| 2012/0114188 A1* | 5/2012 | Murase et al. | 382/112 |
| 2012/0206520 A1* | 8/2012 | Nieda et al. | 347/11 |
| 2013/0021400 A1* | 1/2013 | Tamagawa | 347/15 |
| 2013/0083107 A1* | 4/2013 | Nishikawa et al. | 347/10 |
| 2013/0201234 A1* | 8/2013 | Sasayama | 347/12 |
| 2013/0271793 A1* | 10/2013 | Moribe | 358/3.06 |
| 2013/0293611 A1* | 11/2013 | Ueshima | 347/12 |
| 2014/0015875 A1* | 1/2014 | Miura et al. | 347/5 |
| 2014/0092164 A1* | 4/2014 | Murase et al. | 347/19 |

* cited by examiner

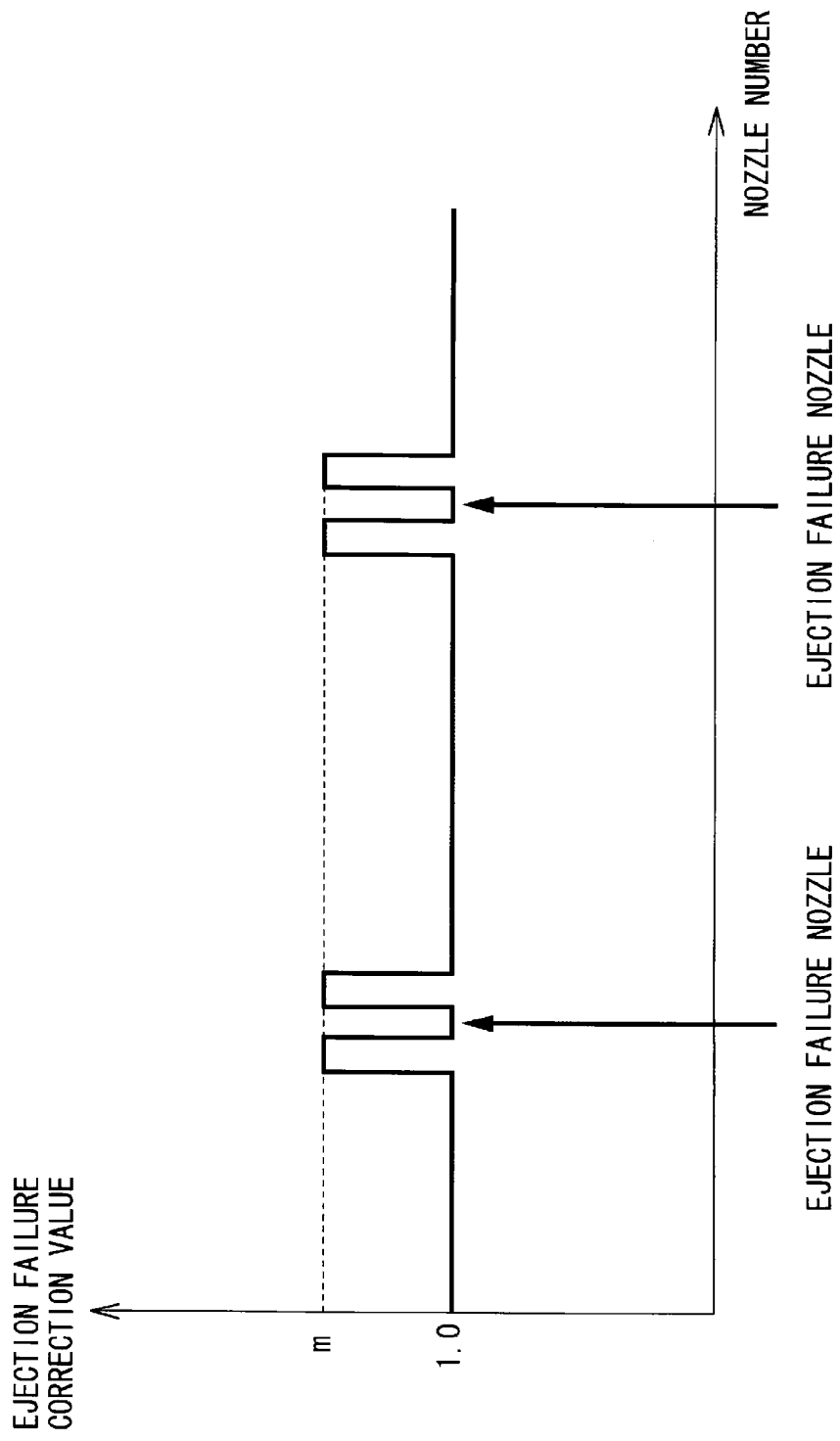

251 252 254
253

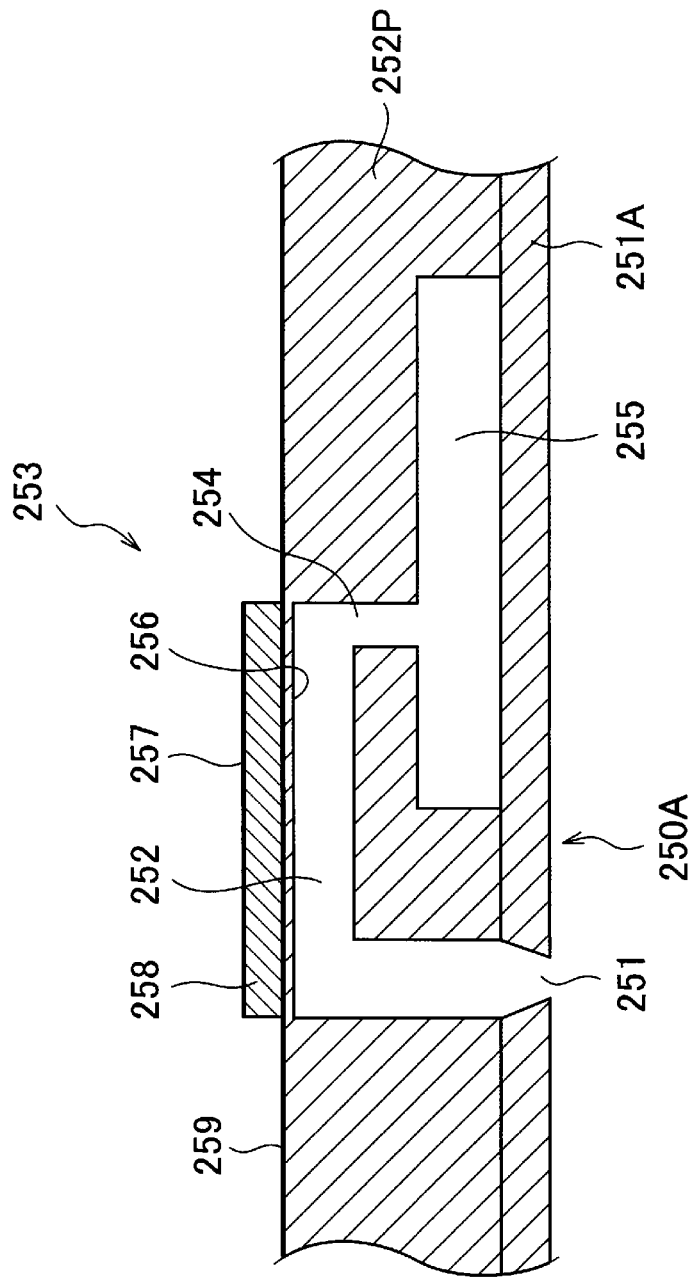

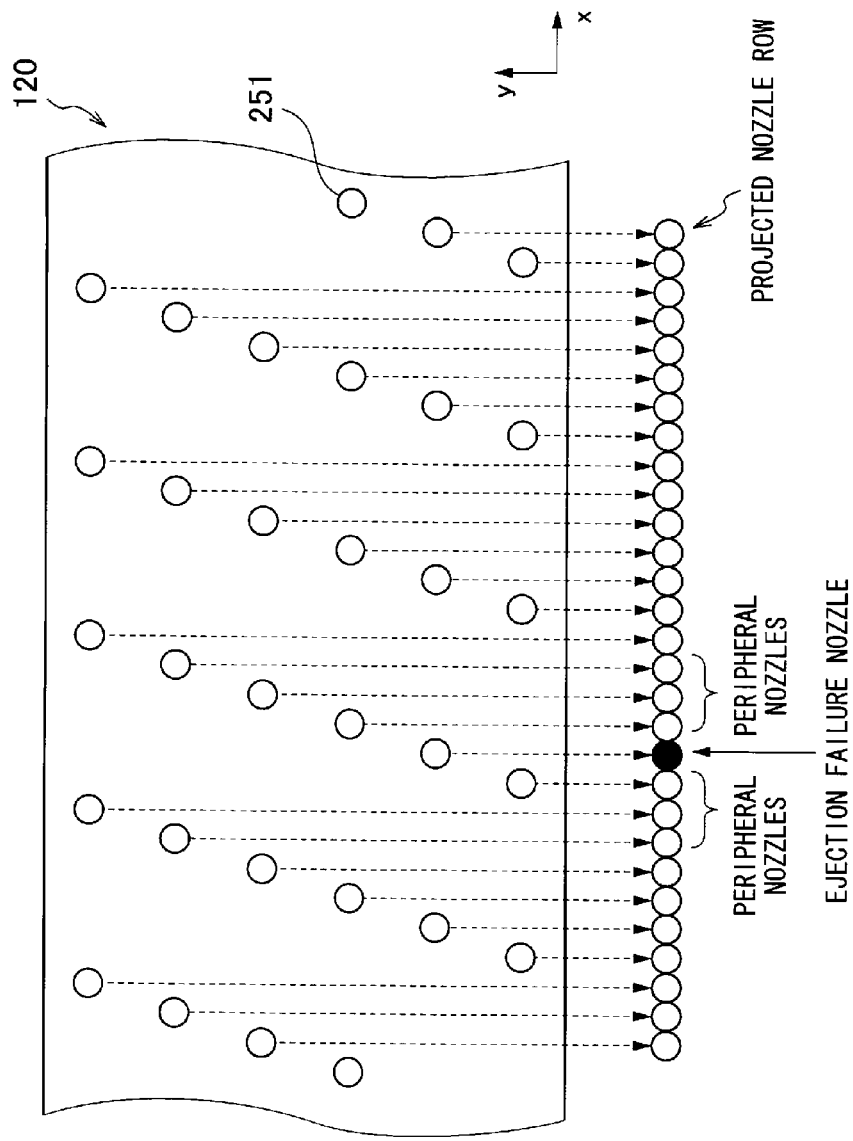

DENSITY NON-UNIFORMITY
CORRECTION VALUE CALCULATED
IN CURRENT OPERATION

DENSITY NON-UNIFORMITY
CORRECTION VALUE CALCULATED
IN CURRENT OPERATION

DENSITY NON-UNIFORMITY
CORRECTION VALUE CALCULATED
IN PREVIOUS OPERATION

IMAGE RECORDING APPARATUS, IMAGE PROCESSING APPARATUS, IMAGE RECORDING METHOD AND IMAGE PROCESSING METHOD, AND RECORDING MEDIUM

BACKGROUND OF THE INVENTION

1. Field of the Invention

The present invention relates to an image recording apparatus, an image processing apparatus, an image recording method and an image processing method and a program, and more particularly, to technology for correcting density non-uniformities produced by fluctuation in the properties of respective recording elements when recording an image on a recording medium by using a recording head including a plurality of recording elements.

2. Description of the Related Art

In an image recording apparatus, such as an inkjet recording apparatus including a plurality of nozzles, fluctuation occurs in the ejection characteristics between nozzles due to drying of ink in the nozzle opening sections with the passage of time, and the apparatus comes to include degraded nozzles which have an impediment associated with ink ejection and ejection failure nozzles which cannot eject ink at all. The presence of degraded nozzles or ejection failure nozzles of this kind is not desirable since it leads to permanent disruption of the recorded image, such as white stripes. Therefore, Japanese Patent Application Publication No. 2003-136764 proposes technology for preventing disruption of a recorded image caused by deterioration of the nozzle ejection characteristics.

Japanese Patent Application Publication No. 2003-136764 discloses an inkjet recording apparatus which records an image on a recording medium by ejecting ink from a plurality of nozzles. In this inkjet recording apparatus, patterns for measuring recording characteristics of the recording head (a shading pattern and an ejection failure detection pattern) are output, the density of the patterns is measured and ejection failure nozzles which are in a non-ejecting state are identified on the basis of these measurement results. Furthermore, a density distribution is determined corresponding to each nozzle, and a convolution integral of this density distribution is found using a visual transfer function (VTF) or point spread function (PSF). The results of the portion corresponding to the ejection failure nozzles of the determined density distribution are compared with predetermined reference set values, and on the basis of this comparison result, a complementation table is specified for each nozzle in order to carry out complementation with inks of a different color to the color of the ink to be ejected from the ejection failure nozzle. The image data corresponding to the ejection failure nozzles is converted into ink ejection information of a different color which is ejected from other nozzles, on the basis of the complementation table which is specified in this way.

However, in the technology described in Japanese Patent Application Publication No. 2003-136764, if a new nozzle suffering ejection failure occurs when the shading pattern is output, in other words, if an uncorrected ejection failure nozzle occurs, then the effects of the light scattering produced by the white stripe on the peripheral measurement density are not taken into account. Therefore, there has been a problem in that the density correction of the nozzles peripheral to the uncorrected ejection failure nozzles involves overcorrection. This effect is especially pronounced when using an inexpensive generic scanner having a low resolution.

Furthermore, if density correction is carried out in respect of portions which are liable to be corrected for ejection failure, then correction is duplicated if ejection failure correction has already been carried out, thus resulting in overcorrection.

SUMMARY OF THE INVENTION

The present invention was devised in view of these circumstances, an object thereof being to provide an image recording apparatus, an image processing apparatus, an image recording method, an image processing method, and a recording medium whereby duplication of density correction and ejection failure correction is avoided and overcorrection in a density correction process can be prevented, even if a new defective recording element has occurred.

In order to achieve the above object, an aspect of an image recording apparatus according to the present invention includes a recording head which has a plurality of recording elements; a historical recording defect information storage device which stores historical recording defect information indicating existing recording elements having a recording defect, from among the plurality of recording elements; a density measurement test chart output device which carries out recording defect correction of a test chart for density measurement for acquiring recording density information indicating a recording density of the plurality of recording elements, on the basis of the historical recording defect information, and which outputs the test chart for density measurement to a recording medium; a recording defect detection test chart output device which outputs, to a recording medium, a test chart for recording defect detection for acquiring measured recording defect information indicating a newest recording element having a recording defect, from among the plurality of recording elements; a reading data acquisition device which acquires read image data obtained by reading the test chart for density measurement and the test chart for recording defect detection which have been output; a density information acquisition device which acquires recording density information indicating a recording density of the plurality of recording elements, on the basis of read image data of the test chart for density measurement; a recording defect information acquisition device which acquires measured recording defect information indicating a newest recording element having a recording defect, from among the plurality of recording elements, on the basis of read image data of the test chart for recording defect detection; a correction hold recording element extraction device which identifies a newest recording element having a recording defect on the basis of the historical recording defect information and the measured recording defect information and extracts recording elements that implement recording on the periphery of the newest recording element having a recording defect, as correction hold recording elements; a density correction value setting device which sets a density correction value for each recording element of the plurality of recording elements, with this density correction value setting device setting a predetermined density correction value in respect of the correction hold recording elements and setting a density correction value calculated on the basis of the acquired recording density information in respect of recording elements other than the correction hold recording elements; an image data acquisition device which acquires image data to be recorded on a recording medium; and an image output device which outputs the acquired image data to a recording medium after carrying out density correction based on the set density correction values for each recording element and recording defect correction based on the measured recording defect information.

According to the present aspect of the invention, since recording density information indicating a recording density of a plurality of recording elements is acquired on the basis of a test chart for density measurement output to a recording medium after carrying out recording defect correction in respect of existing recording elements having a recording defect, recording elements which record in the periphery of a new recording element having a recording defect are extracted as correction hold recording elements on the basis of a test chart for recording defect detection output to the recording medium, predetermined density correction values are set in respect of the correction hold recording elements, density correction values calculated on the basis of the acquired recording density information are set in respect of recording elements other than the correction hold recording elements, and output image data is output to the recording medium on the basis of the set density correction values, then even if a new defective recording element occurs, duplication of density correction and ejection failure correction is avoided and overcorrection in the density correction process can be prevented.

It is preferable that the plurality of recording elements of the recording head are arranged through a length corresponding to a full recordable width of the recording medium, and that the image recording apparatus further includes a conveyance device which performs only once relative movement of the recording head and the recording medium by conveying at least one of the recording head and the recording medium.

The present aspect can be applied to an image recording apparatus including a so-called line head.

It is preferable that the image recording apparatus further includes a historical density correction value storage device which stores density correction values calculated on the basis of the acquired recording density information, and that the density correction value setting device sets a density correction value from before the occurrence of the newest recording element having a recording defect, which is stored in the historical density correction value storage device, for the correction hold recording elements. According to the aspect, it is possible to set a density correction value suited for individual correction hold recording element.

The correction hold recording element extraction device may extract the newest recording element having a recording defect as a correction hold recording element. According to the aspect, it is possible to set a density correction value suited for the newest recording element having a recording defect.

It is preferable that the test chart for density measurement is constituted by a plurality of different density patterns, the density information acquisition device acquires the recording density information for each of the different density patterns, and the density correction value setting device calculates a density correction value for each of the different density patterns. According to the aspect, it is possible to calculate an appropriate density correction value.

The plurality of recording elements may be ink ejection nozzles, and the recording elements having a recording defect may be ink ejection nozzles having an ejection defect. The present aspect can be applied to an ink ejection apparatus having ink ejection nozzles.

It is preferable that the image output device corrects a recording defect of an ink ejection nozzle having an ejection defect, by either carrying out substitute droplet ejection from nozzles neighboring the ink ejection nozzle having the ejection defect or enlarging an ink droplet size. According to the aspect, it is possible to appropriately correct a recording defect of an ink ejection nozzle having an ejection defect.

It is preferable that the recording head is provided for each of a plurality of colors. The present aspect can be applied to an ink ejection apparatus which forms an image by a plurality of colors.

It is preferable that the reading data acquisition device includes an image reading device which reads the test chart for density measurement and the test chart for recording defect detection which have been output. Being provided with an image reading device makes it possible to carry out all the processes on line, which enables processing in a short time.

A reading resolution of the image reading device in a direction of arrangement of the plurality of recording elements may be smaller than a recording resolution of the plurality of recording elements. The present aspect can be adopted even in a case that a reading resolution is smaller than a recording resolution.

It is preferable that the correction hold recording element extraction device extracts the correction hold recording elements on the basis of the recording resolution of the plurality of recording elements and the reading resolution of the image reading device in the direction of arrangement of the plurality of recording elements. According to the present aspect, it is possible to appropriately extract the correction hold recording elements.

In order to achieve the above object, an aspect of an image processing apparatus includes a read data acquisition device which acquires read image data of a test chart for density measurement for acquiring recording density information indicating a recording density of a plurality of recording elements of a recording head, the test chart for density measurement being output to a recording medium after carrying out recording defect correction on the basis of historical recording defect information indicating existing recording elements having a recording defect, and read image data of a test chart for recording defect detection for acquiring recording defect information indicating recording elements having a recording defect, from among the plurality of recording elements, the test chart for recording defect detection being output to the recording medium; a density information acquisition device which acquires recording density information indicating a recording density of the plurality of recording elements, on the basis of read image data of the test chart for density measurement; a recording defect information acquisition device which acquires measured recording defect information indicating a recording element having a recording defect, from among the plurality of recording elements, on the basis of read image data of the test chart for recording defect detection; a correction hold recording element extraction device which identifies a newest recording element having a recording defect on the basis of the historical recording defect information and the measured recording defect information and extracts recording elements that implement recording on the periphery of the newest recording element having a recording defect, as correction hold recording elements; and a density correction value setting device which sets a density correction value for each recording element of the plurality of recording elements, the density correction value setting device setting a predetermined density correction value in respect of the correction hold recording elements and setting a density correction value calculated on the basis of the acquired recording density information in respect of recording elements other than the correction hold recording elements.

In order to achieve the above object, an aspect of an image recording method a density measurement test chart output step of acquiring historical recording defect information indicating existing recording elements having a recording defect, from among a plurality of recording elements of a recording head, carrying out recording defect correction of a test chart for density measurement for acquiring recording density information indicating a recording density of the plurality of recording elements, on the basis of the acquired historical recording defect information, and outputting the test chart for density measurement to a recording medium; a recording defect detection test chart output step of outputting, to a recording medium, a test chart for recording defect detection for acquiring recording defect information indicating a recording element having a recording defect, from among the plurality of recording elements; a reading data acquisition step of acquiring read image data obtained by reading the test chart for density measurement and the test chart for recording defect detection which have been output; a density information acquisition step of acquiring recording density information indicating a recording density of the plurality of recording elements, on the basis of read image data of the test chart for density measurement; a recording defect information acquisition step of acquiring measured recording defect information indicating a recording element having a recording defect, from among the plurality of recording elements, on the basis of read image data of the test chart for recording defect detection; a correction hold recording element extraction step of identifying a newest recording element having a recording defect on the basis of the historical recording defect information and the measured recording defect information and extracting recording elements that implement recording on the periphery of the newest recording element having a recording defect, as correction hold recording elements; a density correction value setting step of setting a density correction value for each recording element of the plurality of recording elements, with this density correction value setting step setting a predetermined density correction value in respect of the correction hold recording elements and setting a density correction value calculated on the basis of the acquired recording density information in respect of recording elements other than the correction hold recording elements; an image data acquisition step of acquiring image data to be recorded on a recording medium; and an image output step of outputting the acquired image data to a recording medium after carrying out density correction based on the set density correction values for each recording element and recording defect correction based on the measured recording defect information.

Further, in order to achieve the above object, an aspect of an image processing method includes a read data acquisition step of acquiring read image data of a test chart for density measurement for acquiring recording density information indicating a recording density of a plurality of recording elements of a recording head, the test chart for density measurement being output to a recording medium after carrying out recording defect correction on the basis of historical recording defect information indicating existing recording elements having a recording defect, and read image data of a test chart for recording defect detection for acquiring recording defect information indicating recording elements having a recording defect, from among the plurality of recording elements, the test chart for recording defect detection being output to the recording medium; a density information acquisition step of acquiring recording density information indicating a recording density of the plurality of recording elements, on the basis of read image data of the test chart for density measurement; a recording defect information acquisition step of acquiring measured recording defect information indicating a recording element having a recording defect, from among the plurality of recording elements, on the basis of read image data of the test chart for recording defect detection; a correction hold recording element extraction step of identifying a newest recording element having a recording defect on the basis of the historical recording defect information and the measured recording defect information and extracting recording elements that implement recording on the periphery of the newest recording element having a recording defect, as correction hold recording elements; and a density correction value setting step of setting a density correction value for each recording element of the plurality of recording elements, with this density correction value setting step setting a predetermined density correction value in respect of the correction hold recording elements and setting a density correction value calculated on the basis of the acquired recording density information in respect of recording elements other than the correction hold recording elements.

Further, in order to achieve the above object, an aspect of the present invention provides a non-transitory recording medium in which computer readable code of an image processing program is stored, and the image processing program causes a computer to execute: a read data acquisition step of acquiring read image data of a test chart for density measurement for acquiring recording density information indicating a recording density of a plurality of recording elements of a recording head, the test chart for density measurement being output to a recording medium after carrying out recording defect correction on the basis of historical recording defect information indicating existing recording elements having a recording defect, and read image data of a test chart for recording defect detection for acquiring recording defect information indicating recording elements having a recording defect, from among the plurality of recording elements, the test chart for recording defect detection being output to the recording medium; a density information acquisition step of acquiring recording density information indicating a recording density of the plurality of recording elements, on the basis of read image data of the test chart for density measurement; a recording defect information acquisition step of acquiring measured recording defect information indicating a recording element having a recording defect, from among the plurality of recording elements, on the basis of read image data of the test chart for recording defect detection; a correction hold recording element extraction step of identifying a newest recording element having a recording defect on the basis of the historical recording defect information and the measured recording defect information and extracting recording elements that implement recording on the periphery of the newest recording element having a recording defect, as correction hold recording elements; and a density correction value setting step of setting a density correction value for each recording element of the plurality of recording elements, with this density correction value setting step setting a predetermined density correction value in respect of the correction hold recording elements and setting a density correction value calculated on the basis of the acquired recording density information in respect of recording elements other than the correction hold recording elements. Various types of recording medium such as semiconductor memory devices and opt-magnetic devices can be adopted as the recording medium in the aspect.

According to the present invention, even if a new defective recording element has occurred, duplication of density correction and ejection failure correction is avoided, and overcorrection in the density correction process can be avoided.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a diagram for describing ejection failure correction;

FIG. 7 is a cross-sectional diagram showing a three-dimensional composition of a droplet ejection element;

FIG. 15 is a diagram for describing nozzles peripheral to an ejection failure nozzle.

Figure 2A:
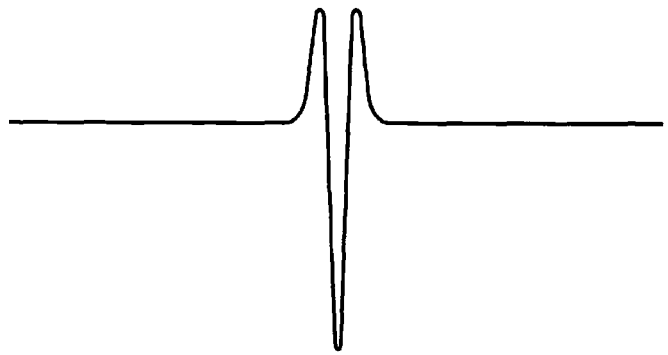
FIGS. 2A to 2E are diagrams for describing density non-uniformity correction relating to an existing ejection failure nozzle.

OCCURRENCE OF OVERCORRECTION DUE TO DUPLICATION OF EJECTION FAILURE CORRECTION And DENSITY CORRECTION

Firstly, the occurrence of overcorrection due to duplication of ejection failure correction and density non-uniformity correction will be described.

<Ejection Failure Correction>

Ejection failure correction means reducing the effects of ejection failure by using normally functioning nozzles, in cases where there are nozzles which cannot eject ink, or nozzles at which an ink ejection operation has been halted due to deflection of the flight of the ink, or the like.

In order to reduce the effects of an ejection failure, the density of the ink ejected from the nozzles adjacent to an ejection failure nozzle should be raised. In other words, as shown in FIG. 1, an ejection failure correction value m which is larger than the ejection failure correction value of other nozzles is set for the nozzles adjacent to an ejection failure nozzle. The ejection failure correction value m is a value set previously by experimentation, and m>1 (for example, m=1.4 to 1.6). The ejection failure correction value relating to nozzles other than the nozzles adjacent to an ejection failure nozzle is 1.0.

In this way, ejection failure correction values are set in such a manner that the density of the image data corresponding to the nozzles adjacent to an ejection failure nozzle is raised. By changing the density values of the image data in accordance with these ejection failure correction values, ejection failure correction is performed.

<Density Non-Uniformity Correction>

Density non-uniformity correction means correcting density non-uniformities in an image by adjusting an ink amount ejected from each nozzle so as to eliminate fluctuation in the ejection amount of each nozzle.

In order to perform density non-uniformity correction, it is necessary to calculate a density non-uniformity correction value for each nozzle. Density non-uniformity correction values are calculated by recording a test chart for density measurement on a recording medium, and then reading out the recorded test chart with a scanner. Below, the calculation process for the density non-uniformity correction values will be described.

<Calculation of Density Non-Uniformity Correction Values>

Firstly, data of a test chart for density measurement is input as input image data. The data of the test chart for density measurement has a uniform density in the nozzle arrangement direction (x direction) and has a prescribed width in a direction perpendicular to the nozzle arrangement direction (y direction).

Next, ejection failure correction is carried out on the basis of ejection failure nozzle information. Ejection failure nozzle information means information for identifying nozzles which cannot perform ink ejection or nozzles at which ink ejection has been halted due to ink flight abnormalities, or the like. As described in relation to FIG. 1, ejection failure correction is carried out by changing the density values of the image data in accordance with the set ejection failure correction values.

Density correction is not carried out when outputting the test chart for density measurement. Consequently, after ejection failure correction, halftone processing is carried out and a test chart for density measurement is recorded on a recording medium. Due to the ejection failure correction, processing for increasing the number of droplet ejection actions from nozzles adjacent to an ejection failure nozzle (substitute droplet ejection processing) and/or processing for increasing the ejection droplet size is carried out, to achieve an image in which white stripes due to ejection failure nozzles are not visible. Here, the test chart for density measurement is recorded at a resolution of 1200 dpi.

FIG. 2A is a diagram showing the recording density in the periphery of an ejection failure nozzle, in a test chart for density measurement which is recorded on a recording medium. Here, the horizontal axis represents the nozzle position and the vertical axis represents the recording density. As shown in FIG. 2A, due to the fact that ejection failure correction has been carried out, the density of the region corresponding to the nozzles adjacent to the ejection failure nozzles is recorded as a high density.

The image of this test chart for density measurement is read in by the scanner and stored as image data. Here, the reading resolution of the scanner is 500 dpi. Density measurement values are obtained on the basis of the image data thus read.

Figure 2B:
Figure 2C:
Figure 2D:

FIG. 2B is a diagram showing density measurement values peripheral to an ejection failure nozzle. Moreover, FIG. 2C is a diagram showing density measurement values at increased definition (of 1200 dpi) in accordance with the resolution of the image data. Next, density non-uniformity correction values for each nozzle are calculated on the basis of the acquired density measurement values. FIG. 2D shows density non-uniformity correction values for nozzles peripheral an ejection failure nozzle calculated on the basis of the density measurement values shown in FIG. 2C.

By correcting the image data on the basis of the density non-uniformity correction values thus calculated, it is possible to correct density non-uniformities. In other words, the density non-uniformity correction involves processing for adjusting the number and size of ink droplets ejected from the nozzles in such a manner that the density becomes higher for nozzles having a low density measurement value, and the density becomes lower for nozzles having a high density measurement value.

By amending the density non-uniformity correction values with the ejection failure correction values, it is possible to achieve both ejection failure correction and density non-uniformity correction. For example, the amended density non-uniformity correction value is set as the product of the ejection failure correction value and the density non-uniformity correction value. By using density non-uniformity correction values which have been amended in this way, it is possible to raise the density appropriately at the nozzles adjacent to the ejection failure nozzles.

Figure 2E:
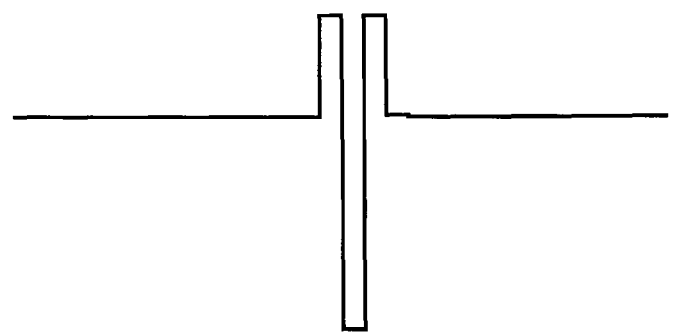

FIG. 2E is a diagram showing the density of an image recorded when density non-uniformity correction has been carried out using amended density non-uniformity correction values. In this way, suitable density correction and ejection failure correction can be performed.

<If a New Ejection Failure Nozzle has Occurred>

Next, a case is described in which, when recording a test chart for density measurement, a new ejection failure nozzle which is not included in the ejection failure nozzle information has occurred.

Firstly, data of a test chart for density measurement is input as input image data. Next, ejection failure correction is carried out on the basis of the ejection failure nozzle information. At this stage, the new ejection failure nozzle is not included in the ejection failure nozzle information. Therefore, the ejection failure correction values for the nozzles adjacent to this new ejection failure nozzle are set to 1.0.

After ejection failure correction, halftone processing is carried out and a test chart for density measurement is recorded on the recording medium (here, the recording resolution is taken to be 1200 dpi).

Figure 3A:
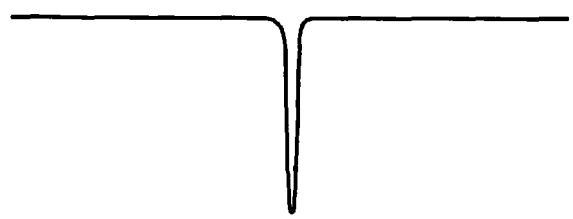
FIGS. 3A to 3F are diagrams for describing density non-uniformity correction relating to a new ejection failure nozzle.

FIG. 3A is a diagram showing recording densities peripheral to a new ejection failure nozzle. As shown in FIG. 3A, since ejection failure correction has not been carried out in respect of the new ejection failure nozzle, then the ejection failure is recorded as a density error in the form of a white stripe.

Figure 3B:
Figure 3C:

This image is read in by the scanner (here, the reading resolution is taken to be 500 dpi), and density measurement values are obtained. FIG. 3B is a diagram showing density measurement values peripheral to an ejection failure nozzle. Moreover, FIG. 3C is a diagram showing density measurement values at increased definition in accordance with the resolution of the image data. As shown in FIG. 3C, if the reading resolution of the scanner is lower than the recording resolution of the nozzles, then the white stripe-shaped density error is detected as a density error having a prescribed width.

Figure 3D:

Next, density non-uniformity correction values for each nozzle are calculated on the basis of the acquired density measurement values. FIG. 3D shows density non-uniformity correction values for nozzles peripheral to an ejection failure nozzle calculated on the basis of the density measurement values shown in FIG. 3C. As stated above, the density correction involves processing for adjusting the size of ink droplets ejected from the nozzles in such a manner that the density becomes higher for nozzles having a low density measurement value, and the density becomes lower for nozzles having a high density measurement value. Consequently, density correction values which raise the density is set in respect of the density error having a prescribed width.

Figure 3E:
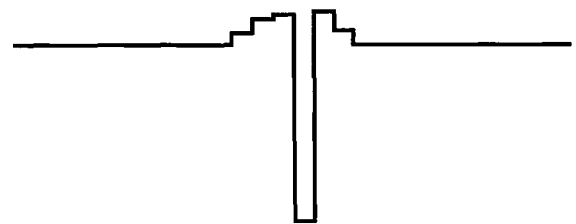

Furthermore, FIG. 3E is a diagram showing the density of an image recorded when density correction has been carried out using the density correction values shown in FIG. 3D. As shown in FIG. 3E, density correction having a prescribed width is applied in respect of the new ejection failure nozzle, and a white stripe-shaped density error caused by the new ejection failure nozzle is generated.

Thereupon, when ejection failure nozzle detection processing is carried out, this new ejection failure nozzle is detected and the ejection failure nozzle information is updated. In this case, the product of the ejection failure correction value m and the density non-uniformity correction value set so as to raise the density is established as an amended density non-uniformity correction value for the nozzles adjacent to the new ejection failure nozzle.

Figure 3F:
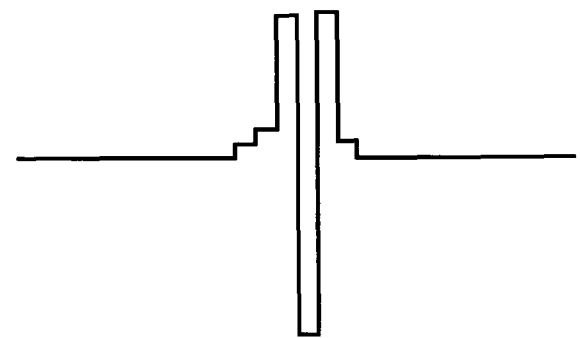

FIG. 3F is a diagram showing the density of an image recorded when ejection failure correction has been carried out in respect of a new ejection failure nozzle and density non-uniformity correction has been carried out using amended density non-uniformity correction values. As shown in FIG. 3F, despite the fact that density correction has been carried out for the density error having a prescribed width in relation to the new ejection failure, further ejection failure correction has also been carried out, with the result that the density of the nozzles adjacent to the new ejection failure nozzle becomes too high.

As described above, the present applicants discovered that when a new ejection failure nozzle has occurred when outputting a test chart for density measurement, then ejection failure correction and density correction are duplicated in the portion peripheral to the ejection failure nozzle, and hence there is a problem in that overcorrection occurs.

[General Composition of Inkjet Recording Apparatus]

Figure 4:
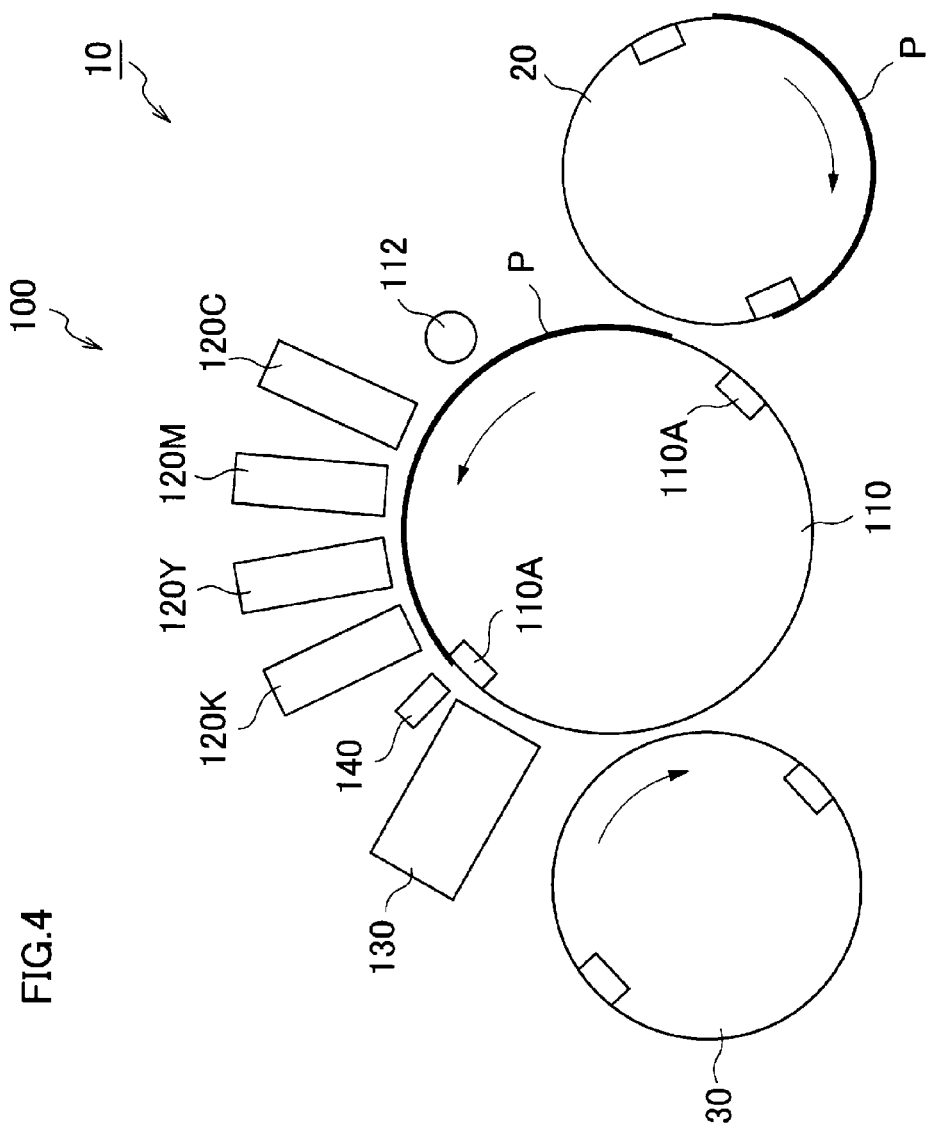
FIG. 4 is a general schematic drawing showing one embodiment of an inkjet recording apparatus.

FIG. 4 is a general schematic drawing showing one embodiment of an inkjet recording apparatus (which corresponds to an image recording apparatus) relating to the embodiment.

This inkjet recording apparatus 10 is a single-pass type of inkjet printer which forms a desired color image by ejecting droplets of inks of a plurality of colors from inkjet heads onto paper P (which corresponds to a recording medium), and is principally constituted by a paper supply unit (not shown) supplying paper P, an image recording unit 100 which records an image by an inkjet method using aqueous ink on a surface (printing surface) of paper P supplied from the paper supply unit, and a paper output unit (not illustrated) which outputs paper P on which an image has been recorded in the image recording unit 100.

<Image Recording Unit>

The image recording unit 100 forms a color image on the printing surface of the paper P by ejecting droplets of inks (aqueous inks) of the respective colors of C, M, Y and K onto the printing surface of the paper P. The image recording unit 100 is principally constituted by an image recording drum 1110 which conveys paper P, a paper pressing roller 112 which presses the paper P conveyed by the image recording drum 110 and causes the paper P to make tight contact with the peripheral surface of the image recording drum 110, inkjet heads (corresponding to the recording head, simply called "head" below) 120C, 120M, 120Y and 120K which eject ink droplets of respective colors of cyan (C), magenta (M), yellow (Y) and black (K) onto paper P, an imaging unit 130 which reads in an image recorded on the paper P, a mist filter 140 which captures ink mist, and a drum temperature adjustment unit 142.

The image recording drum 110 is a conveyance device for paper P in the image recording unit 100. The image recording drum 110 is formed in a round cylindrical shape and is caused to rotate by being driven by a motor (not illustrated). A gripper 110A is provided on the outer circumferential surface of the paper supply drum 110, and a leading end of the paper P is gripped by this gripper 110A. The image recording drum 110 conveys the paper P while the paper P is wrapped about the circumferential surface of the drum 110, by gripping the leading end of the paper P with the gripper 110A and rotating. Furthermore, a plurality of suction holes (not illustrated) are formed in a prescribed pattern in the circumferential surface of the image recording drum 110. The paper P which is wrapped about the circumferential surface of the image recording drum 110 is conveyed while being held by suction on the circumferential surface of the image recording drum 110, by being suctioned via the suction holes. Consequently, it is possible to convey the paper P with a high degree of flatness.

The suctioning from the suction holes acts only in a fixed range, and acts only between a prescribed suction start position and a prescribed suction end position. The suction start position is set at the position where the paper pressing roller 112 is installed, and the suction end position is set on the downstream side of the position where the imaging unit 130 is installed (for example, a position where the paper P is transferred to conveyance drum 30 of the next stage). More specifically, the suction region is set in such a manner that that paper P is suctioned and held against the circumferential surface of the image recording drum 110 at least at the ink droplet ejection positions of the heads 120C, 120M, 120Y and 120K and the image reading position of the imaging unit 130.

The mechanism for suctioning and holding the paper P on the circumferential surface of the image recording drum 110 is not limited to a suctioning method based on negative pressure as described above, and it is also possible to employ a method based on electrostatic suction.

Furthermore, the image recording drum 110 according to the present embodiment is composed in such a manner that grippers 110A are provided in two positions on the outer circumferential surface, whereby two sheets of paper P can be conveyed in one revolution of the drum 110. Rotation of the conveyance drum 20 and the image recording drum 110 which convey the paper P from the paper supply unit to the image recording unit 100 is controlled so as to match the transfer timings of the sheets of paper P onto and off from the drums 20 and 110. In other words, the drums 20 and 110 are driven so as to have the same circumferential speed, and are also driven in such a manner that the positions of the respective grippers match each other.

The paper pressing roller 112 is arranged in the vicinity of the paper reception position on the image recording drum 110 (the position where the paper P is received from the conveyance drum 20). The paper pressing roller 112 is constituted by a rubber roller and is installed so as to be abutted and pressed against the circumferential surface of the image recording drum 110. The paper P which has been transferred from the conveyance drum 20 of the previous stage to the image recording drum 110 is nipped upon passing the paper pressing roller 112, and is caused to make tight contact with the circumferential surface of the image recording drum 110.

The four heads 120C, 120M, 120Y and 120K are arranged at a fixed interval apart along the conveyance path of the paper P by the image recording drum 110. These heads 120C, 120M, 120Y and 120K are constituted by line heads which correspond to the paper width. The heads 120C, 120M, 120Y and 120K are arranged so as to be substantially perpendicular to the conveyance direction of the paper P by the image recording drum 110 (the y direction), and are also arranged in such a manner that the nozzle surfaces thereof oppose the circumferential surface of the image recording drum 110. The heads 120C, 120M, 120Y and 120K record an image on paper P which is conveyed by the image recording drum 110 by ejecting ink droplets towards the image recording drum 110 from nozzle rows formed on the nozzle surfaces thereof.

The imaging unit 130 (which corresponds to an image reading device) is an imaging device which captures an image recorded by the heads 120C, 120M, 120Y and 120K and is disposed to the downstream side of the head 120K which is disposed in the last position, in the conveyance direction of the paper P by the image recording drum 110 (the y direction). The imaging unit 130 includes a line sensor constituted by a solid imaging element, such as a CCD or a CMOS, and a fixed-focus imaging optical system, for example.

The mist filter 140 is arranged between the final inkjet head 120K and the imaging unit 130, and captures ink mist by suctioning the air in the periphery of the image recording drum 110. In this way, by capturing the ink mist through suctioning air in the periphery to the image recording drum 110, it is possible to prevent infiltration of ink mist into the imaging unit 130. By this means, it is possible to prevent the occurrence of reading errors, and the like.

The image recording section 100 has the composition described above. The paper P transferred from the conveyance drum 20 is received by the image recording drum 110. The image recording drum 110 grips the leading end of the paper P, with the gripper 110A, and by rotating, conveys the paper P. The paper P which has been transferred to the image recording drum 110 passes the paper pressing roller 112 and is thereby caused to make tight contact with the circumferential surface of the image recording drum 110. Simultaneously with this, the paper P is suctioned from the suction holes of the image recording drum 110 and is thereby suctioned and held on the outer circumferential surface of the image recording drum 110. The paper P is conveyed in this state and passes the heads 120C, 120M, 120Y and 120K. During this passage of the paper P, the heads 120C, 120M, 120Y, and 120K eject droplets of inks of the respective colors C, M, Y and K onto the printing surface of the paper P, thereby forming a color image on the printing surface.

The paper P on which an image has been recorded by the heads 120C, 120M, 120Y and 120K then passes through the imaging unit 130. The image recorded on the printing surface of the paper P is read in while the paper P passes the imaging unit 130. This reading of the recorded image is carried out according to requirements, and inspection for density correction, and the like, is carried out on the basis of the read image. The image is read while in a state of being suctioned and held on the image recording drum 110, and therefore it is possible to read the image with high accuracy.

Thereupon, the suctioning of the paper P is released and the paper P is transferred to a conveyance drum 40 that conveys the paper P to the paper output unit.

<Structural Example of the Inkjet Head>

Next, the structure of a inkjet head will be described. The heads 120C, 120M, 120Y and 120K corresponding to respective colors have the same structure, and a reference numeral 120 is hereinafter designated to any of the heads.

Figure 5A:
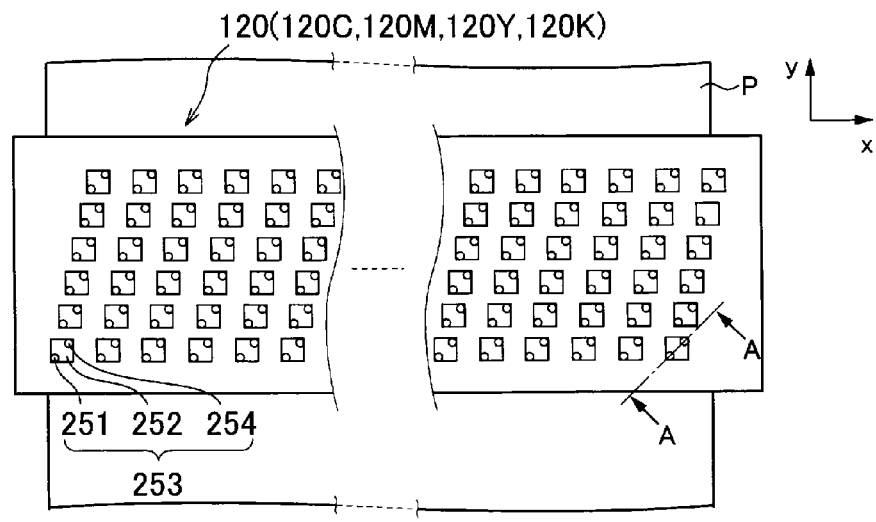
FIGS. 5A and 5B are plan view perspective diagrams showing an example of the structure of a head.
Figure 5B:
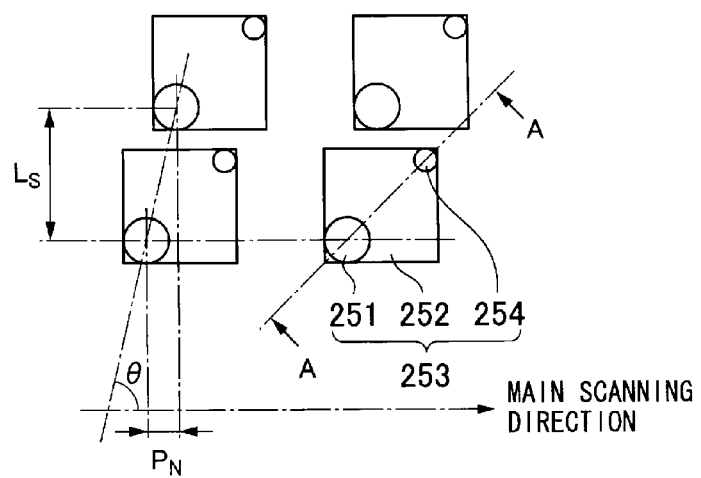
Figure 6A:
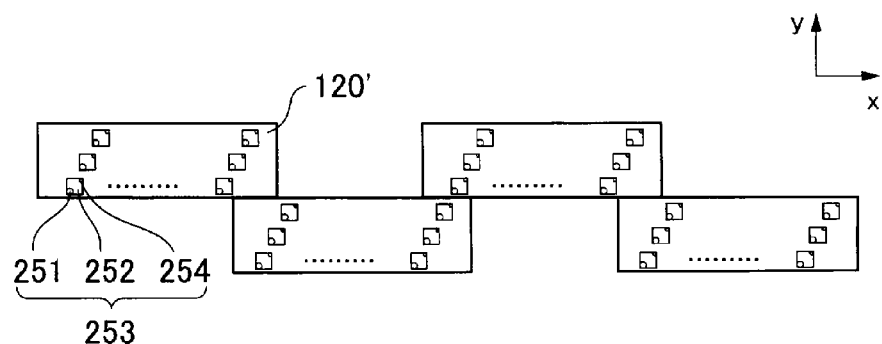
FIGS. 6A and 6B are plan view perspective diagrams showing a further example of the structure of a head.
Figure 6B:
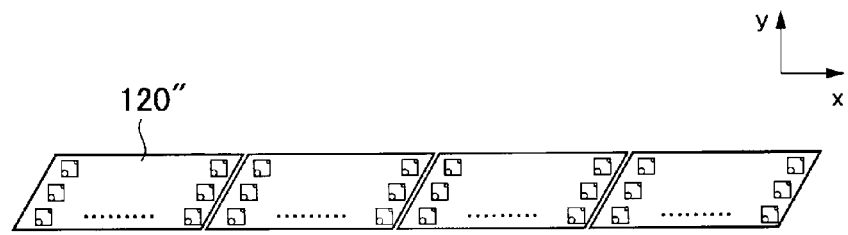

FIG. 5A is a perspective plan view showing an example of the configuration of the head 120, FIG. 5B is an enlarged view of a portion thereof, FIGS. 6A and 6B are perspective plan views showing another example of the configuration of the head 120, and FIG. 7 is a cross-sectional view taken along the line A-A in FIGS. 5A and 5B, showing the three-dimensional structure of a droplet ejection element (an ink chamber unit for one nozzle 251) corresponding to one channel serving as a recording element unit.

As shown in FIGS. 5A and 5B, the head 120 according to the present embodiment has a structure in which a plurality of ink chamber units (droplet ejection elements) 253, each comprising a nozzle 251 (corresponding to a recording element) forming an ink ejection port, a pressure chamber 252 corresponding to the nozzle 251, and the like, are disposed two-dimensionally in the form of a matrix, and hence the effective nozzle interval (the projected nozzle pitch) as projected (orthogonally projected) in the lengthwise direction of the head (the direction perpendicular to conveyance direction of paper P, x direction) is reduced and high nozzle density is achieved.

The mode of composing a nozzle row having a length equal to or greater than the full width Wm of the image formation region of the paper P in a direction (x direction) which is substantially perpendicular to the conveyance direction (y direction) of the paper P is not limited to the present example. For example, instead of the composition in FIG. 5A, it is possible to adopt a mode in which a line head having a nozzle row of a length corresponding to the full width of the paper P is composed by joining together in a staggered configuration short head modules 120' in which a plurality of nozzles 251 are arranged in a two-dimensional arrangement, as shown in FIG. 6A, or a mode in which head modules 120" are joined together in an alignment in one row as shown in FIG. 6B.

The invention is not limited to a case where the full surface of the paper P is taken as the image forming region, and in cases where a portion of the surface of the paper P is taken as the image forming region (for example, if a non-image forming region is provided at the periphery of the paper P, or the like), nozzle rows required for image formation in the prescribed image forming range should be provided.

The pressure chambers 252 provided to correspond to the respective nozzles 251 have a substantially square planar shape (see FIGS. 5A and 5B), an outlet port to the nozzle 251 being provided in one corner of a diagonal of the pressure chamber, and an ink inlet port (supply port) 254 being provided in the other corner thereof. The shape of the pressure chamber 252 is not limited to that of the present example and various modes are possible in which the planar shape is a quadrilateral shape (diamond shape, rectangular shape, or the like), a pentagonal shape, a hexagonal shape, or other polygonal shape, or a circular shape, elliptical shape, or the like.

As shown in FIG. 7, the head 120 has a structure in which a nozzle plate 251A in which nozzles 251 are formed, a flow channel plate 252P in which flow channels such as pressure chambers 252 and a common flow channel 255, and the like, are formed, and so on, are layered and bonded together. The nozzle plate 251A constitutes the nozzle surface (ink ejection surface) 250A of the head 120 and a plurality of nozzles 251 which are connected respectively to the pressure chambers 252 are formed in a two-dimensional configuration therein.

The flow channel plate 252P is a flow channel forming member which constitutes side wall portions of the pressure chambers 252 and in which a supply port 254 is formed to serve as a restricting section (most constricted portion) of an individual supply channel for guiding ink to each pressure chamber 252 from the common flow channel 255. For the sake of the description, a simplified view is given in FIG. 7, but the flow channel plate 252P has a structure formed by layering together one or a plurality of substrates.

The nozzle plate 251A and the flow channel plate 252P can be processed into a desired shape by a system configuration manufacturing process using silicon as a material.

The common flow channel 255 is connected to an ink tank (not shown), which is a base tank that supplies ink, and the ink supplied from the ink tank is supplied through the common flow channel 255 to the pressure chambers 252.

Piezoelectric actuators 258 each including an individual electrode 257 are bonded to a diaphragm 256 which constitutes a portion of the surfaces of the pressure chambers 252 (the ceiling surface in FIG. 7). The diaphragm 256 according to the present embodiment is made of silicon (Si) having a nickel (Ni) conducting layer which functions as a common electrode 259 corresponding to the lower electrodes of the piezoelectric actuators 258, and serves as a common electrode for the piezoelectric actuators 258 which are arranged so as to correspond to the respective pressure chambers 252. A mode is also possible in which a diaphragm is made from a non-conductive material, such as resin, in which case, a common electrode layer made of a conductive material, such as metal, is formed on the surface of the diaphragm material. Furthermore, the diaphragm which also serves as a common electrode may be made of a metal (conductive material), such as stainless steel (SUS), or the like.

When a drive voltage is applied to an individual electrode 257, the piezoelectric actuator 258 deforms, thereby changing the volume of the pressure chamber 252. This causes a pressure change which results in ink being ejected from the nozzle 251. When the piezoelectric actuator 258 returns to its original position after ejecting ink, the pressure chamber 252 is replenished with new ink from the common flow channel 255 via the supply port 254.

As shown in FIG. 5B, the high-density nozzle head according to the present embodiment is achieved by arranging a plurality of ink chamber units 253 having the above-described structure in a lattice fashion based on a fixed arrangement pattern, in a row direction which coincides with the x direction, and a column direction which is inclined at a fixed angle of θ with respect to the x direction.

In the matrix arrangement as thus explained, when the interval of adjacent nozzles in the y direction is defined as Ls, it is assumed equivalently that each nozzle 251 is arranged substantially linearly in the x direction at a predetermined pitch of $P_N$=Ls/tan θ. With the nozzle arrangement according to the present embodiment, in a nozzle row projected to an alignment in the x direction, there are 1200 nozzles per inch (1200 dpi).

Furthermore, in implementing the present invention, the mode of arrangement of the nozzles 251 in the head 120 is not limited to the example shown in the drawings, and it is possible to adopt various nozzle arrangements. For example, instead of the matrix arrangement shown in FIGS. 5A and 5B, it is possible to use a bent line-shaped nozzle arrangement, such as a V-shaped nozzle arrangement, or a zigzag shape (W shape, or the like) in which a V-shaped nozzle arrangement is repeated.

The device for generating ejection pressure (ejection energy) for ejecting droplets from the nozzles in the inkjet head is not limited to a piezoelectric actuator (piezoelectric element), and it is also possible to employ pressure generating elements (energy generating elements) of various types, such as a heater (heating element) in a thermal method (a method which ejects ink by using the pressure created by film boiling upon heating by a heater) or actuators of various kinds based on other methods. A corresponding energy generating element is provided in the flow channel structure in accordance with the ejection method of the head.

<Imaging Unit>

Figure 8:
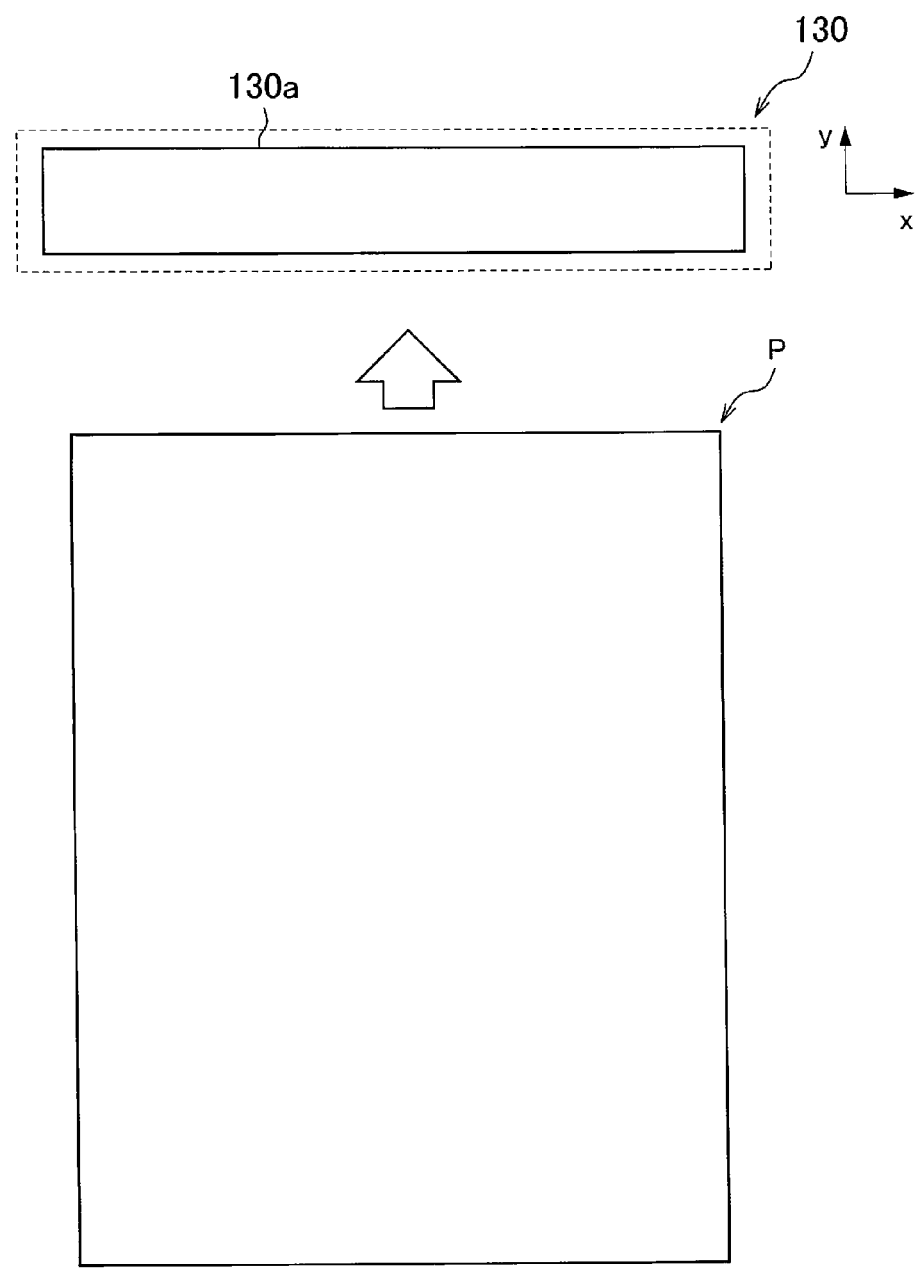
FIG. 8 is a schematic drawing showing an example of a composition of an imaging unit.

Next, the imaging unit 130 will be described. FIG. 8 is a schematic drawing showing an example of a composition of the imaging unit 130. As shown in FIG. 8, the imaging unit 130 is composed by a line sensor 130a. In the line sensor 130a, a plurality of solid imaging elements are arranged through the full width of the paper P in the x direction, and in the present embodiment, the reading resolution in the x direction is 500 dpi. The reading resolution in the y direction is determined by the reading speed of the imaging elements and the conveyance speed of the paper P.

The paper P is conveyed to a position opposing the line sensor 130a of the imaging unit 130 by the image recording drum 110 (not illustrated in FIG. 8). The line sensor 130a can read the whole region of the paper P in one conveyance action of the paper P.

If a portion of the surface of the paper P is an image forming region, then solid imaging elements capable of reading within that image forming region should be arranged in the line sensor 130a.

<Description of Control System>

Figure 9:
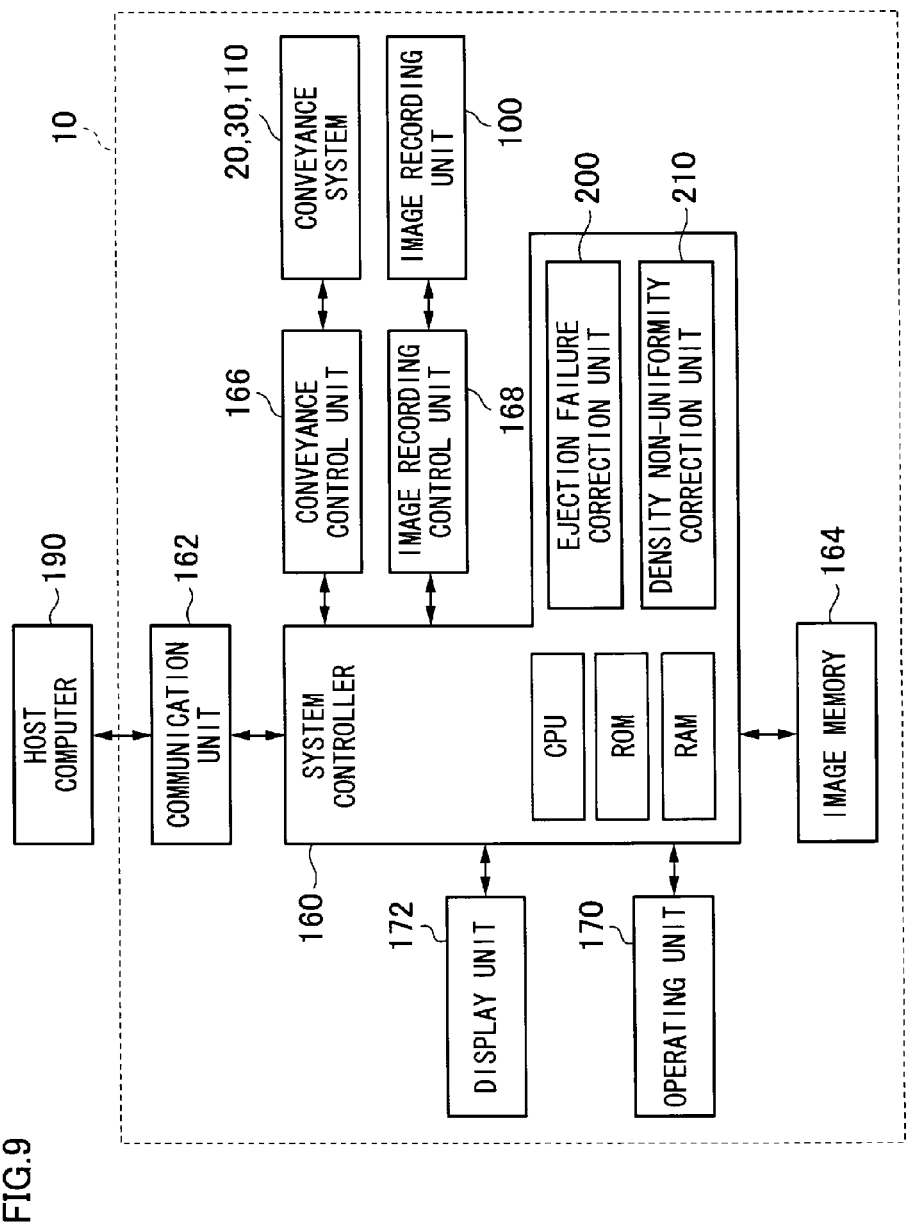
FIG. 9 is a block diagram showing the general composition of a control system of an inkjet recording apparatus.

FIG. 9 is a block diagram showing a general composition of a control system of an inkjet recording apparatus 10 according to the present embodiment.

As shown in FIG. 9, the inkjet recording apparatus 10 includes, apart from the image recording unit 100 shown in FIG. 4, a system controller 160, a communications unit 162, an image memory 164, a conveyance control unit 166, an image recording control unit 168, an operating unit 170, a display unit 172, and the like.

The system controller 160 is an image processing apparatus which functions as a control device that performs overall control of the respective units of the inkjet recording apparatus 10, and also functions as a calculation device that performs various calculation processes. This system controller 160 includes a CPU, a ROM, a RAM and the like, and operates in accordance with a prescribed control program. A control program which is executed by the system controller 160 and various data required for control purposes are stored in a ROM.

Furthermore, the system controller 160 is constituted by an ejection failure correction unit 200 and a density non-uniformity correction unit 210.

The ejection failure correction unit 200 functions as a recording defect information acquisition device which acquires ejection failure nozzle information on the basis of data of a test chart for ejection failure detection read in by the line sensor 130a, as well as functioning as an ejection failure correction device which corrects image errors caused by ejection failure nozzles.

The density non-uniformity correction unit 210 functions as a density correction value calculation device which acquires density non-uniformity correction values for each nozzle on the basis of data of a test chart for density measurement read in by the line sensor 130a, as well as functioning as a density correction device which corrects density non-uniformity for each nozzle.

The communications unit 162 (which corresponds to an image data acquisition device) includes a prescribed communications interface, and sends and receives data between the communications interface and a connected host computer 190.

The image memory 164 functions as a temporary storage device for various data including image data, and data is read from and written to the memory via the system controller 160. Image data which has been read in from a host computer 190 via the communications unit 162 is stored in the image memory 164.

The conveyance control section 166 controls the conveyance system for the paper P in the inkjet recording apparatus 10. More specifically, the conveyance control section 166 controls driving of the image recording drum 110 in the image recording unit 100, and also of the conveyance drum 20, and the conveyance drum 30. The conveyance control section 166 controls the conveyance system in accordance with instructions from the system controller 160, in such a manner that the paper P is conveyed smoothly.

The image recording control section 168 controls the image recording section 100 in accordance with the instructions from the system controller 160. More specifically, the driving of the heads 120C, 120M, 120Y and 120K is controlled in such a manner that a prescribed image is recorded on the paper P conveyed by the image recording drum 110. In other words, the system controller 160 and the image recording control unit 168 function as an image output device.

The operating unit 170 includes prescribed operating devices (for example, operating buttons, keyboard, touch panel, and the like), and outputs operating information input via the operating devices to the system controller 160. The system controller 160 executes various processing in accordance with the operational information input from the operating unit 170.

The display section 172 includes a prescribed display apparatus (for example, an LCD panel, or the like), and causes prescribed information to be displayed on the display apparatus in accordance with instructions from the system controller 160.

As stated previously, image data to be recorded on the paper P is read into the inkjet recording apparatus 10 from the host computer 190 via the communications section 162. Here, it is supposed that multiple-value tonal image data for each ink color (for example, 256-tone image data for each color corresponding to the four colors of C, M, Y and K) is acquired. The image data read in is stored in the image memory 164.

The system controller 160 generates dot data by carrying out prescribed signal processing on the image data stored in the image memory 164. In this case, ejection failure correction is carried out by the ejection failure correction unit 200 and density non-uniformity correction is carried out by the density non-uniformity correction unit 210. The image recording control unit 168 controls driving of the heads 120C, 120M, 120Y and 120K of the image recording unit 100, in accordance with the generated dot data, and records an image represented by this image data on a printing surface of the paper P.

In general, the dot data is generated by subjecting the image data to color conversion processing and halftone processing. The color conversion processing is processing for converting image data represented by a sRGB system, for instance (for example, 8-bit RGB image data) into ink amount data of the respective colors used by the inkjet recording apparatus (in the present embodiment, ink volume data for the respective colors of C, M, Y and K).

Half-tone processing is processing for converting the color data of the respective colors generated by the color conversion processing into dot data of respective colors by error diffusion or the like.

The system controller 160 generates dot data of the respective colors by applying color conversion processing and halftone processing to the image data. An image represented by the image data is recorded on the paper P by controlling the driving of the corresponding inkjet heads in accordance with the dot data for the respective colors thus generated.

<Ejection Failure Correction Unit>

Figure 10:
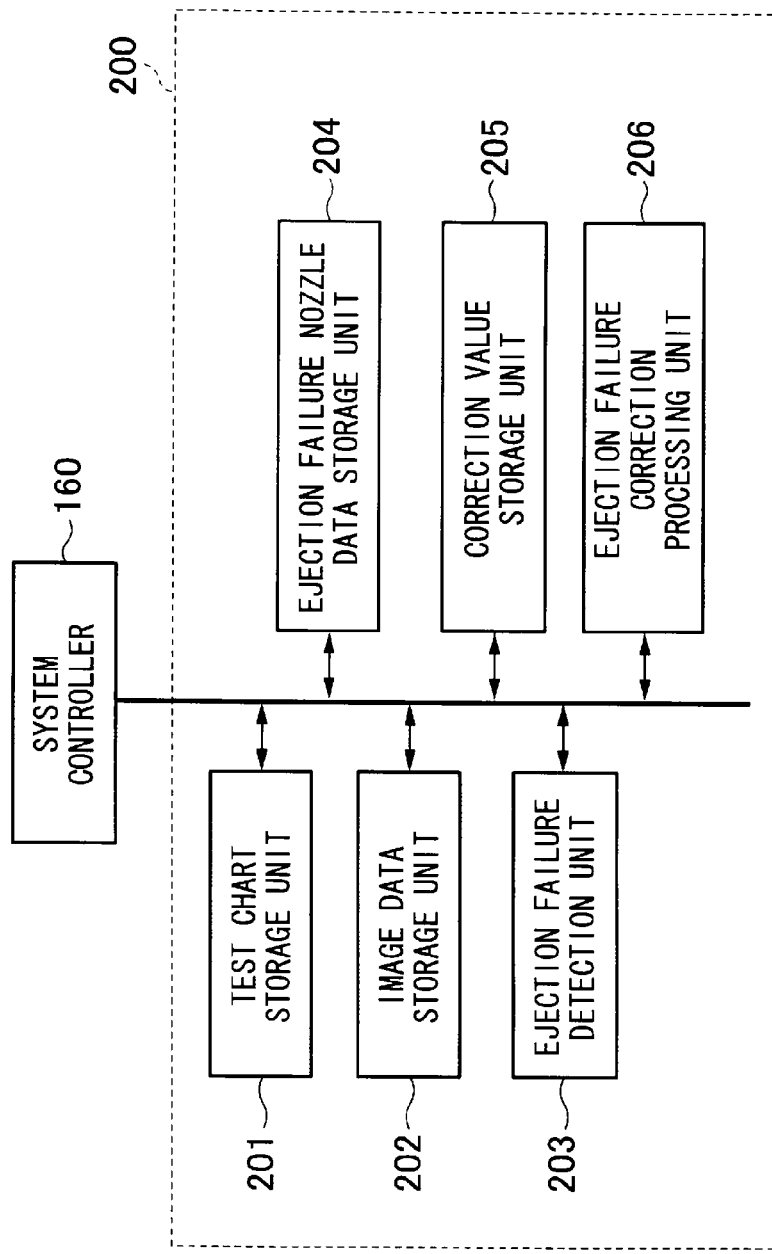
FIG. 10 is a block diagram showing an internal composition of an ejection failure correction unit.

FIG. 10 is a block diagram showing the internal composition of the ejection failure correction unit 200. As shown in FIG. 10, the ejection failure correction unit 200 includes: a test chart storage unit 201, an image data storage unit 202, an ejection failure detection unit 203, an ejection failure nozzle data storage unit 204, a correction value storage unit 205, an ejection failure correction processing unit 206, and the like.

Data of the test chart for ejection failure detection (indicated by reference numeral C1 in FIG. 12) is stored in the test chart storage unit 201. The test chart storage unit 201 sends data of the test chart for ejection failure detection to the image recording control unit 168 due to an instruction from the system controller 160. The image recording control unit 168 controls driving of the heads 120C, 120M, 120Y and 120K, and outputs the test chart onto the printing surface of the paper P. In other words, the image recording control unit 168 functions as a test chart for recording defect detection output device.

The test chart image recorded by the image recording unit 100 is captured by the line sensor 130a and is stored as inspection image data of the test chart for ejection failure detection in the image data storage unit 202.

The ejection failure detection unit 203 (which corresponds to the recording defect information acquisition unit) detects ejection failure nozzles (corresponding to recording elements having a recording defect), on the basis of the inspection image data stored in the image data storage unit 202.

The information about the ejection failure nozzles detected by the ejection failure detection unit 203 (this information corresponds to measured recording defect information) is stored in the ejection failure nozzle data storage unit 204 (which corresponds to a historical recording defect information storage device). Information about ejection failure nozzles detected in the past by the ejection failure detection unit 203 (this information corresponds to historical recording defect information) is accumulated in the ejection failure nozzle data storage unit 204. When the operation of a defective nozzle producing ink flight deflection, or the like, is halted, then this fact is stored in the ejection failure nozzle data storage unit 204.

The correction value storage unit 205 stores an ejection failure correction value m for a case where an adjacent nozzle is suffering an ejection failure. In the present embodiment, the ejection failure correction value m is stored for each nozzle and for each tone value.

The ejection failure correction processing unit 206 carries out ejection failure correction processing on the basis of the information about the ejection failure nozzles stored in the ejection failure nozzle data storage unit 204. Here, the density values in the image data corresponding to the nozzles adjacent to an ejection failure nozzle are updated in accordance with the ejection failure correction value m.

<Density Non-Uniformity Correction Unit>

Figure 11:
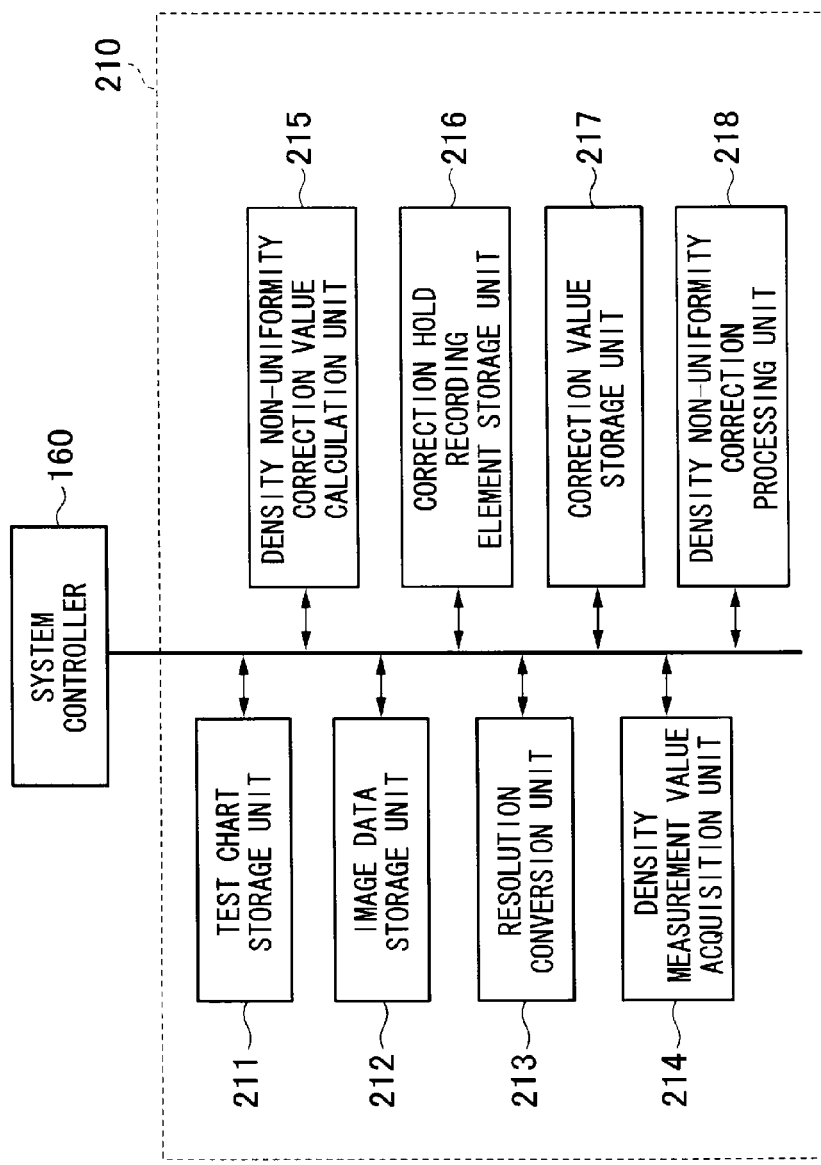
FIG. 11 is a block diagram showing an internal composition of a density non-uniformity correction unit.

FIG. 11 is a block diagram showing an internal composition of the density non-uniformity correction unit 210. As shown in FIG. 11, the density non-uniformity correction unit 210 includes: a test chart storage unit 211, an image data storage unit 212, a resolution conversion unit 213, a density measurement value acquisition unit 214, a density non-uniformity correction value calculation unit 215, a correction hold nozzle storage unit 216, a correction value storage unit 217, a density non-uniformity correction processing unit 218, and the like.

Data of the test chart for density measurement (indicated by reference numeral C2 in FIG. 12) is stored in the test chart storage unit 211. The test chart storage unit 211 sends data of the test chart for density measurement C2 to the system controller 160 due to an instruction from the system controller 160. The system controller applies ejection failure correction to the data of the test chart for density measurement C2 and then sends the data to the image recording control unit 168. The image recording control unit 168 controls driving of the heads 120C, 120M, 120Y and 120K, and outputs the test chart onto the printing surface of the paper P. In other words, the image recording control unit 168 functions as a density measurement test chart output device.

The test chart image recorded on the printing surface of the paper P is captured by the line sensor 130a upon an instruction from the system controller 160. This captured data is stored as inspection image data in the image data storage unit 212.

The resolution conversion unit 213 carries out resolution conversion of the inspection image data read out from the image data storage unit 212. For example, if the reading resolution of the line sensor 130a is 500 dpi and the reading resolution of the head 120 is 1200 dpi, then the inspection image data of 500 dpi is converted into inspection image data of 1200 dpi.

The density measurement value acquisition unit 214 (which corresponds to a density information acquisition device) acquires density measurement values (corresponding to recording density information) for each pixel row (each nozzle row), on the basis of the inspection image data of which the resolution has been converted.

The density non-uniformity correction value calculation unit 215 calculates density non-uniformity correction values for each nozzle on the basis of the density measurement values for each pixel row which are acquired by the density measurement value acquisition unit 214. For example, in respect of a nozzle which is liable to appear dark, a density non-uniformity correction value for correcting the tone value indicated by the pixel data corresponding to that nozzle is calculated in such a manner that an image fragment is formed lightly. Furthermore, in respect of a nozzle which is liable to appear light, a density non-uniformity correction value for correcting the tone value indicated by the pixel data corresponding to that nozzle region is calculated in such a manner that an image fragment is formed darkly.

The information about correction hold nozzles is stored in the correction hold nozzle storage unit 216. The density non-uniformity correction value calculation unit 215 sets a density non-uniformity correction value that is different from the value calculated by the method described above, in respect of correction hold nozzles which are stored in the correction hold nozzle storage unit 216. The details of the correction hold nozzles are described below.

The density non-uniformity correction values calculated by the density non-uniformity correction value calculation unit 215 are stored in the correction value storage unit 217 (which corresponds to a historical density correction value storage device). The density non-uniformity correction processing unit 218 reads out density non-uniformity correction values stored in the correction value storage unit 217 and performs density non-uniformity correction of the output image data.

[Description of Test Chart]

Figure 12:
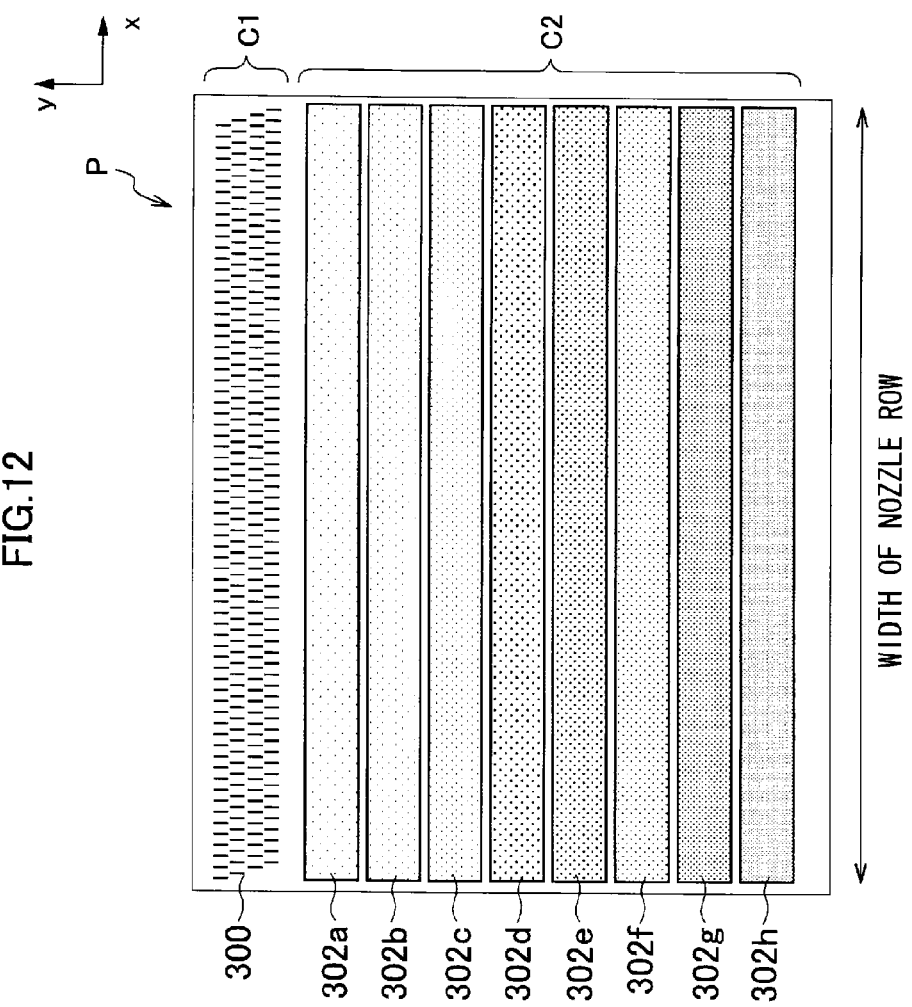
FIG. 12 is a diagram showing a test chart recorded on paper.

FIG. 12 is a diagram showing a test chart which is recorded on paper P on the basis of data of the test chart for ejection failure detection C1 which is stored in the test chart storage unit 201 and data of the test chart for density measurement C2 which is stored in the test chart storage unit 211. Here, of the color heads 120, a test chart printed by a head of one color is shown.

The test chart for ejection failure detection C1 is formed by printing a line-shaped pattern 300 substantially parallel to the y direction, at prescribed intervals apart in the x direction. Here, the interval d in the x direction between the patterns 300 is set in accordance with the resolution of the in-line sensor 130a. For example, when the reading resolution R of the line sensor 130a in the x direction was 500 dpi, the interval d of the pattern 300 in the x direction is d≥1/R=1/500 [inch].

When creating a test chart for ejection failure detection C1, more specifically, one line of a pattern 300 is printed by ejecting liquid from every other n nozzles in the x direction. Here, if the recording resolution N in the x direction of the head 120 is 1200 dpi and the reading resolution R in the x direction of the line sensor 130a is 500 dpi, then n is an integer no less than N/R=2.4.

Thereupon, the nozzles which are to eject liquid are shifted by one nozzle in the x direction and printing is carried out by every other n nozzles. By repeating this n times, a pattern 300 formed by liquid ejection from all of the nozzles is printed. By this means, it is possible to create a test chart for ejection failure detection C1 which makes it possible to judge whether or not a nozzle is an ejection failure nozzle, at the resolution of the line sensor 130a, in respect of each of the nozzles.

The y-direction length of the pattern 300 is set in view of the reading speed based on the resolution of the imaging elements, in other words, the conveyance speed of the paper P, in such a manner that the region from the start to the end of each pattern 300 is captured completely and clearly when capturing an image using the line sensor 130a.

Furthermore, the test chart for density measurement C2 consists of density patches (density patterns) of uniform density in the x direction, in which density patches 302a to 302h having respectively different densities are printed so as to be staggered in the y direction in order of their density. The number of density patches and the order of their arrangement is not limited to the example shown in FIG. 12, and can be specified appropriately. The test chart for density measurement C2 is output without carrying out density non-uniformity correction in respect of each nozzle. In other words, this test chart is printed on the basis of the same input value for each nozzle, in each of the density patches.

[Density Correction Processing of Inkjet Recording Apparatus]

Figure 13:
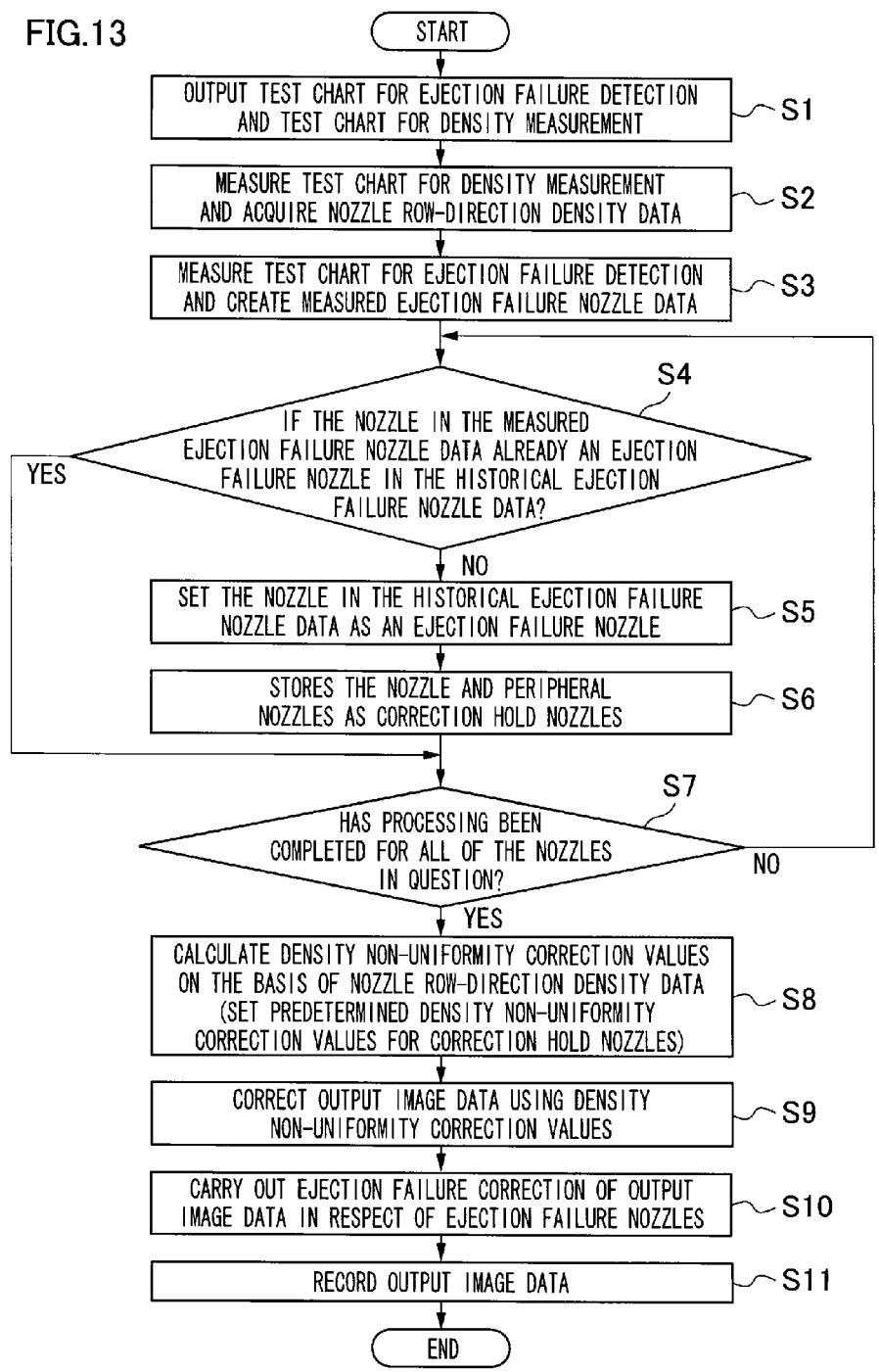
FIG. 13 is a flowchart showing operation of an inkjet recording apparatus.

The density non-uniformity correction processing according to the present embodiment will now be described. FIG. 13 is a flowchart showing operation of an inkjet recording apparatus 10 from output of a test chart until recording of an output image. Here, a head 120C of one color is described, but similar processing should be carried out for the heads of the other three colors, 120M, 120Y and 120K.

<Step S1 (Corresponding to a Test Chart for Recording Defect Detection Output Step)>

Firstly, a test chart for ejection failure detection C1 and a test chart for density measurement C2 as shown in FIG. 12 are recorded on paper P. This test chart recording process can be carried out at a timing indicated by the user, such as when the power supply is switched on, or can be carried out periodically, such as when printing of a prescribed number of sheets has been completed. Furthermore, at this stage, the storage contents of the correction hold nozzle storage unit 216 are cleared.

The system controller 160 acquires data of the test chart for ejection failure detection C1 from the test chart storage unit 201 and acquires data of the test charge for density measurement C2 from the test chart storage unit 211. The data of the test chart for ejection failure detection C1 is sent to the image recording control unit 168.

Furthermore, in the ejection failure correction processing unit 206, ejection failure correction is applied to the data of the test chart for density measurement C2, on the basis of information about the ejection failure nozzles which is stored in the ejection failure nozzle data storage unit 204 and the ejection failure correction value m for the nozzle in question which is stored in the correction value storage unit 205. In other words, the recording density values in the data corresponding to the nozzles adjacent to an existing ejection failure nozzle are updated in accordance with the ejection failure correction value m.

In the system controller 160, halftone processing is applied to the data of the test chart for density measurement C2 which has undergone ejection failure correction, and this data is sent to the image recording control unit 168.

The image recording control unit 168 controls the driving of the head 120C on the basis of the received data and records the test chart for ejection failure detection C1 and the test chart for density measurement C2 on the printing surface of the paper P.

<Step S2 (Corresponding to a Test Chart for Density Measurement Output Step>

Next, the density of the test chart for density measurement C2 which has been recorded on the paper P is measured, and nozzle row-direction density data for each density patch is obtained.

The line sensor 130a captures the test chart output onto the printing surface of the paper P (corresponding to an image reading step). The resolution conversion unit 213 converts the resolution from the reading resolution of the line sensor 130a to the recording resolution of the head 120C, in respect of the inspection image data of the test chart for density measurement C2 that has been captured.

Figure 14:
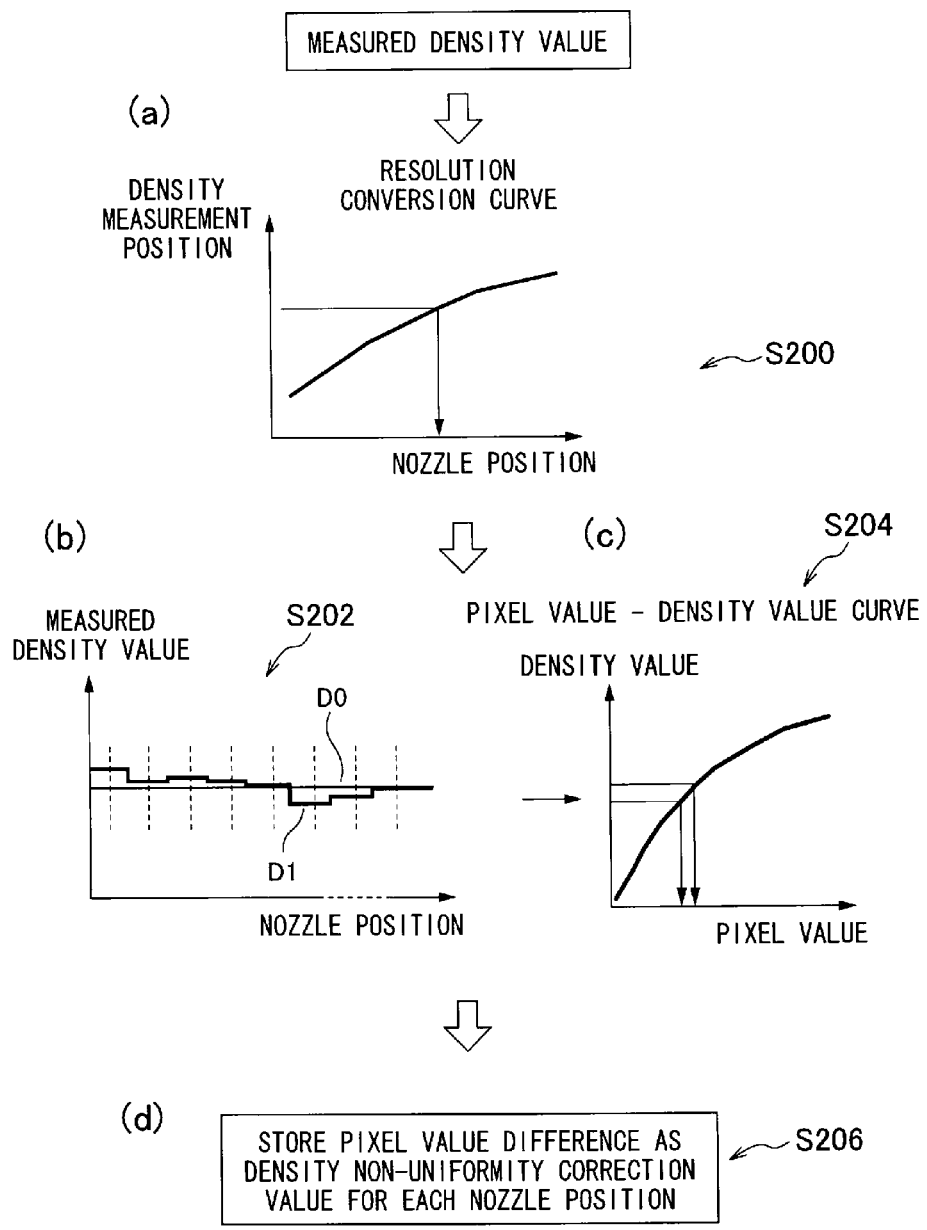
FIG. 14 is a diagram showing processing for calculating a density non-uniformity correction value.

This conversion of the resolution is carried out by converting the measured density values for respective density measurement positions into density data for respective nozzle positions, in accordance with a resolution conversion curve which represents a correspondence between the read pixel positions (density measurement positions) of the line sensor 130a and the nozzle positions of the head 120C (step S200 in FIG. 14).

The density measurement value acquisition unit 214 acquires nozzle row-direction density data for each density patch on the basis of the inspection image data of which the resolution has been converted (corresponding to a density information acquisition step).

<Step S3>

Thereupon, the test chart for ejection failure detection C1 is measured, thereby creating measured ejection failure nozzle data.

The ejection failure detection unit 203 detects ejection failure nozzles and creates measured ejection failure nozzle data on the basis of the inspection image data of the test chart for ejection failure detection C1 which has been captured by the line sensor 130a (corresponding to a recording defect information acquisition step).

<Step S4>

Next, new ejection failure nozzles are extracted on the basis of the measured ejection failure nozzle data created in step S3.

The system controller 160 judges whether or not a detected ejection failure nozzle is a nozzle which is already stored in the ejection failure nozzle data storage unit 204, in other words, an existing ejection failure nozzle. If the ejection failure nozzle thus detected is judged to be a new ejection failure nozzle, the procedure transfers to step S5, and if the ejection failure is judged to be an existing ejection failure nozzle, then the procedure advances to step S7.

<Step S5>

If the detected ejection failure nozzle is judged to be a new ejection failure nozzle which is not stored in the ejection failure nozzle data storage unit 204, then the system controller 160 stores information about this ejection failure nozzle in the ejection failure nozzle data storage unit 204. Therefore, when an image is subsequently recorded on the paper P, ejection failure correction processing is carried out in respect of this ejection failure nozzle by the ejection failure correction processing unit 206.

<Step S6 (Corresponding to a Correction Hold Recording Element Extraction Step)>

Moreover, the system controller 160 also stores the new ejection failure nozzle and nozzles peripheral to same in the correction hold nozzle storage unit 216 as correction hold nozzles (corresponding to correction hold recording elements). In other words, the system controller 160 functions as a correction hold recording element extraction device.

Here, the peripheral nozzles indicate nozzles positioned peripherally to the ejection failure nozzle when the nozzles are projected to an alignment in the x direction. In other words, the peripheral nozzles include nozzles on either side of the ejection failure nozzle in the projected nozzle row (adjacent nozzles) and may also include nozzles neighboring these adjacent nozzles. FIG. 15 shows an example where three neighboring nozzles on either side of the ejection failure nozzle are taken as peripheral nozzles. Consequently, the peripheral nozzles do not necessarily correspond to nozzles arranged about the periphery of the ejection failure nozzle in the matrix arrangement.

In the present embodiment, four neighboring nozzles on either side of the ejection failure nozzle are taken as peripheral nozzles. Therefore, a total of nine nozzles, namely, the ejection failure nozzle itself and, as peripheral nozzles, four nozzles each to the left and right-hand sides thereof, are stored in respect of one new ejection failure nozzle, as correction hold nozzles, in the correction hold nozzle storage unit 216.

<Step S7>

It is then decided if all of the ejection failure nozzles detected in step S3 have been subjected to a judgment about whether or not the ejection failure nozzle corresponds to an existing ejection failure nozzle in step S4. If there is an ejection failure nozzle for which this judgment has not been made, then the procedure transfers to step S4 and similar processing is carried out. If processing has been completed for all of the ejection failure nozzles, then the procedure transfers to step S8.

<Step S8 (Corresponding to a Density Correction Value Setting Step)>

Density non-uniformity correction values are set for each nozzle on the basis of the nozzle row-direction density data acquired at step S2 and the correction hold nozzle information stored in step S6.

The density non-uniformity correction value calculation unit 215 calculates density non-uniformity correction values for each nozzle on the basis of the nozzle row-direction density data acquired by the density measurement value acquisition unit 214.

In the processing for calculating the density non-uniformity correction values, firstly, a difference between a target density value D0 and the nozzle row-direction density data D1 is worked out by the density measurement value acquisition unit 214 (step S202 in FIG. 14). Thereupon, the difference in the density value calculated in step S202 is converted to a difference in pixel value, in accordance with a pixel value—density value curve that indicates the correspondence between the pixel values and the density values (step S204 in (c) of FIG. 14). The difference in the pixel value is stored as a density non-uniformity correction value for each nozzle (step S206 in (d) of FIG. 14).

Next, the density non-uniformity correction value calculation unit 215 reads out information about correction hold nozzles from the correction hold nozzle storage unit 216. The density non-uniformity correction values for each of the nozzles calculated as described above are set for the nozzles other than the correction hold nozzles. Furthermore, the density non-uniformity correction values stored in the correction value storage unit 217, in other words, the density correction values calculated before the occurrence of a new ejection failure nozzle (the density non-uniformity correction value calculated in the previous operation) are set for the correction hold nozzles. In this way, the density non-uniformity correction value calculation unit 215 functions as a density correction value setting device.

Ejection failure correction is not applied in respect of the new ejection failure nozzle when the test chart for density measurement C2 is output. Therefore, a white stripe caused by the new ejection failure nozzle occurs in the output image of the test chart for density measurement C2. When the output image in which a white stripe has occurred is read in by the line sensor 130a and nozzle row-direction density data is acquired by the density measurement value acquisition unit 214, then due to the effects of light scattering by the white stripe, it is not possible to acquire accurate density data in respect of the nozzles which are peripheral to the new ejection failure nozzle.

Consequently, in the present embodiment, the nozzles peripheral to the new ejection failure nozzle are set as correction hold nozzles, and the density non-uniformity correction values which were calculated in the previous operation and which are stored in the correction value storage unit 217 are set for the correction hold nozzles, instead of the density non-uniformity correction values calculated in the current operation.

The density non-uniformity correction value calculation unit 215 stores the density non-uniformity correction values for each nozzle set in this way, in the correction value storage unit 217.

Figure 16A:
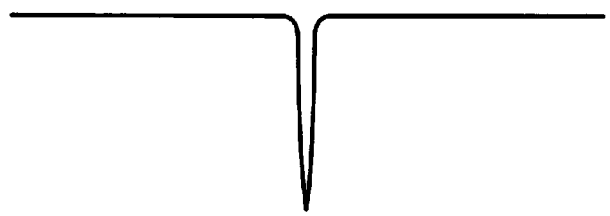
FIGS. 16A to 16E are diagrams for describing density non-uniformity correction in the present embodiment.

FIG. 16A is a diagram showing recording densities peripheral to a new ejection failure nozzle. As shown in FIG. 16A, since ejection failure correction has not been carried out in respect of the new ejection failure nozzle, then the ejection failure is recorded as a density error in the form of a white stripe.

Figure 16B:
Figure 16C:

FIG. 16B is a diagram showing density measurement values peripheral to an ejection failure nozzle. Furthermore, FIG. 16C is a diagram showing density measurement values obtained by converting the resolution of the density measurement values shown in FIG. 16B to density data for each nozzle position.

Figure 16D:
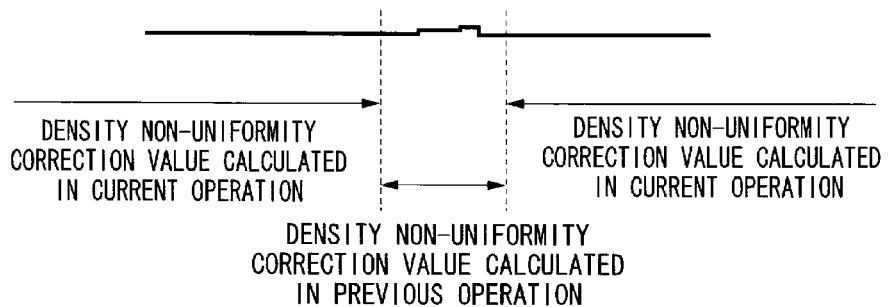

FIG. 16D is a diagram showing density non-uniformity correction values which are set in the density non-uniformity correction value calculation unit 215, in which the density non-uniformity correction values for each nozzle calculated in the current operation are set for the nozzles other than the correction hold nozzles, and the density non-uniformity correction values calculated in the previous operation and stored in the correction value storage unit 217 are set for the correction hold nozzles. As shown in FIG. 16D, density non-uniformity correction values which are not affected by light scattering by the white stripe caused by the new ejection failure nozzle are set.

Figure 16E:
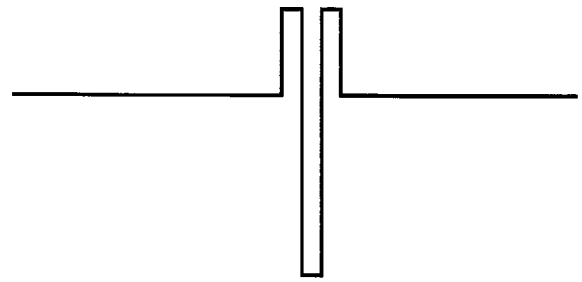

Furthermore, FIG. 16E is a diagram showing the density of an image recorded when density correction has been carried out using the density correction values shown in FIG. 16D. As shown in FIG. 16E, a density error caused by the new ejection failure nozzle does not occur.

In this way, by setting density non-uniformity correction values calculated in the current operation for the correction hold nozzles, it is possible to achieve accurate density non-uniformity correction which is not affected by light scattering due to the white stripe caused by the new ejection failure nozzle.

As described above, nozzles in a range which is affected by light scattering due to the white stripe caused by the new ejection failure nozzle should be set as the peripheral nozzles. Consequently, the number of peripheral nozzles can be specified in accordance with the recording resolution N of the head 120 in the x direction and the reading resolution R of the line sensor 130a in the x direction.

In the present embodiment, since the recording resolution N of the head 120 in the x direction is 1200 dpi and the reading resolution R of the line sensor 130a in the x direction is 500 dpi, then at least N/R=2.4 nozzles, in other words, 3 nozzles neighboring the new ejection failure nozzle need to be set as peripheral nozzles. Here, four neighboring nozzles are set as the peripheral nozzles, in order to take account of the range which is affected by light scattering. It should be noted that experimentation has shown that the range affected by light scattering becomes larger depending on the illumination brightness of the line sensor and the type of paper, and hence there may be cases where 5 to 20 nozzles are set as peripheral nozzles.

Furthermore, predetermined density non-uniformity correction values may be set for the correction hold nozzles, rather than the density non-uniformity correction values calculated in the previous operation. These predetermined density non-uniformity correction values may be the same value for all of the nozzles or may be different values for each nozzle. The predetermined density non-uniformity correction values are stored in the correction value storage unit 217. The density non-uniformity correction values calculated in the previous operation and the predetermined density non-uniformity correction values may be referred to generally as "predetermined density non-uniformity correction values (density correction values)".

Furthermore, in the present embodiment, the new ejection failure nozzle is set as a correction hold nozzle and the density non-uniformity correction value calculated in the previous operation is set for this nozzle. However, since the ejection failure nozzle does not eject ink, then this nozzle cannot correct a density non-uniformity, whatever the value that is set. Consequently, a new ejection failure nozzle does not have to be set as a correction hold nozzle and may be set to the density non-uniformity correction value calculated in the density non-uniformity correction value calculation unit 215. In other words, it is possible to achieve a mode in which only the peripheral nozzles are set as correction hold nozzles. Furthermore, it is also possible to set another value as the density non-uniformity correction value for the new ejection failure nozzle.

<Step S9>

Density non-uniformity correction is carried out in respect of the image data which needs to be recorded on the paper P, on the basis of the density non-uniformity correction values which have been set in this way.

The output image data is sent from the host computer 190 and stored in the image memory 164 (corresponding to an image data acquisition step). The system controller 160 generates dot data by carrying out prescribed signal processing on the image data stored in the image memory 164.

In this case, the density non-uniformity correction processing unit 218 acquires density non-uniformity correction values for each nozzle stored in the correction value storage unit 217 and performs density non-uniformity correction of the output image data.

<Step S10>

Thereupon, ejection failure correction is applied to the output image data which has undergone density non-uniformity correction.

The ejection failure correction processing unit 206 reads out ejection failure nozzle information from the ejection failure nozzle data storage unit 204. Furthermore, the ejection failure correction value m corresponding to the ejection failure nozzle is read out from the correction value storage unit 205.

Moreover, the ejection failure correction processing unit 206 applies ejection failure correction to the data of the region corresponding to the nozzles adjacent to the ejection failure nozzles, of the image data that has undergone density non-uniformity correction in step S9, by using the ejection failure correction value m.

Rather than respectively carrying out density non-uniformity correction and ejection failure correction, it is also possible to amend the density non-uniformity correction values using the ejection failure correction values, and to carry out density non-uniformity correction using these amended density non-uniformity correction values. More specifically, the density non-uniformity correction values are amended as indicated in (Formula 1) below.

$$\text{(Amended density non-uniformity correction value)} = \text{(Density non-uniformity correction value)} \times \text{(Ejection failure correction value)} \quad \text{(Formula 1)}$$

Density non-uniformity correction should be carried out using these amended density non-uniformity correction values. By amending the density non-uniformity correction values in this way, ejection failure correction can be carried out accurately by multiplying the ejection failure correction value m by the data of the region corresponding to the nozzles adjacent to the ejection failure nozzles.

<Step S11>

Finally, an output image is recorded on paper P on the basis of the output image data which has undergone density non-uniformity correction and ejection failure correction (corresponding to the image output step).

In other words, the image recording control unit 168 controls driving of the head 120C in such a manner that a prescribed image is recorded on the paper P conveyed by the image recording drum 110, in accordance with instructions from the system controller 160.

As described above, according the present embodiment, even if a new ejection failure nozzle has occurred when the density is measured, duplication of density correction and ejection failure correction is avoided, and overcorrection can be prevented in the density correction process.

In the present embodiment, as shown in FIG. 12, a test chart for ejection failure detection C1 is printed, and then a test chart for density measurement C2 is printed, but it is also possible to print the test chart for density measurement C2 first and to then print the test chart for ejection failure detection C1. By printing in this order, a new ejection failure nozzle which occurs when printing the test chart for density measurement C2 can be extracted accurately.

Furthermore, in the present embodiment, a test chart for ejection failure detection C1 and a test chart for density measurement C2 are read out by a line sensor 130a which is mounted on the inkjet recording apparatus 10, but it is also possible to adopt a mode in which the test charts C1 and C2 are read by an off-line scanner which is separate from the inkjet recording apparatus 10, or the like. In this case, it is possible to carry out the present image processing by inputting the read inspection image data to the inkjet recording apparatus 10.

Furthermore, it is also possible to adopt a mode in which the functions of the system controller 160, the ejection failure correction unit 200 and the density non-uniformity correction unit 210 are mounted in a host computer 190 or other computer, in which the ejection failure correction processing and density non-uniformity correction processing is carried out. Furthermore, it is also possible to record a program for realizing this processing in a computer, on a CD-ROM, magnetic disk or other recording medium, and to supply the program to a third party by means of the recording medium, or to present a download service for the program via the Internet or another communications circuit.

Furthermore, the present embodiment was described with reference to application of the present embodiment to an inkjet recording apparatus, but the scope of application of the present invention is not limited to this. More specifically, the present invention can also be applied to image recording apparatuses of a type other than an inkjet recording apparatus, such as a thermal transfer recording apparatus which is equipped with a recording head using thermal elements as recording elements, an LED electrophotographic printer equipped with a recording head using LED elements as recording elements, or a silver halide photographic printer which uses an LED line exposure head.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image recording apparatus, comprising:
a recording head which has a plurality of recording elements;
a historical recording defect information storage device which stores historical recording defect information indicating existing recording elements having a recording defect, from among the plurality of recording elements;
a density measurement test chart output device which carries out recording defect correction of a test chart for density measurement for acquiring recording density information indicating a recording density of the plurality of recording elements, on the basis of the historical recording defect information, and which outputs the test chart for density measurement to a recording medium;
a recording defect detection test chart output device which outputs, to a recording medium, a test chart for recording defect detection for acquiring measured recording defect information indicating a newest recording element having a recording defect, from among the plurality of recording elements;
a reading data acquisition device which acquires read image data obtained by reading the test chart for density measurement and the test chart for recording defect detection which have been output;
a density information acquisition device which acquires recording density information indicating a recording density of the plurality of recording elements, on the basis of read image data of the test chart for density measurement;
a recording defect information acquisition device which acquires measured recording defect information indicating a newest recording element having a recording defect, from among the plurality of recording elements on the basis of read image data of the test chart for recording defect detection;
a correction hold recording element extraction device which identifies a newest recording element having a recording defect on the basis of the historical recording defect information and the measured recording defect information and extracts recording elements that implement recording on the periphery of the newest recording element having a recording defect, as correction hold recording elements;
a density correction value setting device which sets a density correction value for each recording element of the plurality of recording elements, with this density correction value setting device setting a predetermined density correction value in respect of the correction hold recording elements and setting a density correction value calculated on the basis of the acquired recording density information in respect of recording elements other than the correction hold recording elements;
an image data acquisition device which acquires image data to be recorded on a recording medium; and
an image output device which outputs the acquired image data to a recording medium after carrying out density correction based on the set density correction values for each recording element and recording defect correction based on the measured recording defect information.

2. The image recording apparatus as defined in claim 1, wherein the plurality of recording elements of the recording head are arranged through a length corresponding to a full recordable width of the recording medium,
the image recording apparatus further comprising a conveyance device which performs only once relative movement of the recording head and the recording medium by conveying at least one of the recording head and the recording medium.

3. The image recording apparatus as defined in claim 1, further comprising a historical density correction value storage device which stores density correction values calculated on the basis of the acquired recording density information;
wherein the density correction value setting device sets a density correction value from before the occurrence of the newest recording element having a recording defect, which is stored in the historical density correction value storage device, for the correction hold recording elements.

4. The image recording apparatus as defined in claim 1, wherein the correction hold recording element extraction device extracts the newest recording element having a recording defect as a correction hold recording element.

5. The image recording apparatus as defined in claim 1, wherein
the test chart for density measurement is constituted by a plurality of different density patterns;
the density information acquisition device acquires the recording density information for each of the different density patterns; and
the density correction value setting device calculates a density correction value for each of the different density patterns.

6. The image recording apparatus as defined in claim 1, wherein
the plurality of recording elements are ink ejection nozzles; and
the recording elements having a recording defect are ink ejection nozzles having an ejection defect.

7. The image recording apparatus as defined in claim 6, wherein the image output device corrects a recording defect of an ink ejection nozzle having an ejection defect, by either carrying out substitute droplet ejection from nozzles neighboring the ink ejection nozzle having the ejection defect or enlarging an ink droplet size.

8. The image recording apparatus as defined in claim 1, wherein the recording head is provided for each of a plurality of colors.

9. The image recording apparatus as defined in claim 1, wherein the reading data acquisition device comprises an image reading device which reads the test chart for density measurement and the test chart for recording defect detection which have been output.

10. The image recording apparatus as defined in claim 9, wherein a reading resolution of the image reading device in a direction of arrangement of the plurality of recording elements is smaller than a recording resolution of the plurality of recording elements.

11. The image recording apparatus as defined in claim 10, wherein the correction hold recording element extraction device extracts the correction hold recording elements on the basis of the recording resolution of the plurality of recording elements and the reading resolution of the image reading device in the direction of arrangement of the plurality of recording elements.

12. An image processing apparatus, comprising:
a read data acquisition device which acquires read image data of a test chart for density measurement for acquiring recording density information indicating a recording density of a plurality of recording elements of a recording head, the test chart for density measurement being output to a recording medium after carrying out recording defect correction on the basis of historical recording defect information indicating existing recording elements having a recording defect, and read image data of a test chart for recording defect detection for acquiring recording defect information indicating recording elements having a recording defect, from among the plurality of recording elements, the test chart for recording defect detection being output to the recording medium;
a density information acquisition device which acquires recording density information indicating a recording density of the plurality of recording elements, on the basis of read image data of the test chart for density measurement;
a recording defect information acquisition device which acquires measured recording defect information indicating a recording element having a recording defect, from among the plurality of recording elements, on the basis of read image data of the test chart for recording defect detection;
a correction hold recording element extraction device which identifies a newest recording element having a recording defect on the basis of the historical recording defect information and the measured recording defect information and extracts recording elements that implement recording on the periphery of the newest recording element having a recording defect, as correction hold recording elements; and
a density correction value setting device which sets a density correction value for each recording element of the plurality of recording elements, the density correction value setting device setting a predetermined density correction value in respect of the correction hold recording elements and setting a density correction value calculated on the basis of the acquired recording density information in respect of recording elements other than the correction hold recording elements.

13. An image recording method, comprising:
a density measurement test chart output step of acquiring historical recording defect information indicating existing recording elements having a recording defect, from among a plurality of recording elements of a recording head, carrying out recording defect correction of a test chart for density measurement for acquiring recording density information indicating a recording density of the plurality of recording elements, on the basis of the acquired historical recording defect information, and outputting the test chart for density measurement to a recording medium;
a recording defect detection test chart output step of outputting, to a recording medium, a test chart for recording defect detection for acquiring recording defect information indicating a recording element having a recording defect, from among the plurality of recording elements;
a reading data acquisition step of acquiring read image data obtained by reading the test chart for density measurement and the test chart for recording defect detection which have been output;
a density information acquisition step of acquiring recording density information indicating a recording density of the plurality of recording elements, on the basis of read image data of the test chart for density measurement;
a recording defect information acquisition step of acquiring measured recording defect information indicating a recording element having a recording defect, from among the plurality of recording elements, on the basis of read image data of the test chart for recording defect detection;
a correction hold recording element extraction step of identifying a newest recording element having a recording defect on the basis of the historical recording defect information and the measured recording defect information and extracting recording elements that implement recording on the periphery of the newest recording element having a recording defect, as correction hold recording elements;
a density correction value setting step of setting a density correction value for each recording element of the plurality of recording elements, with this density correction value setting step setting a predetermined density correction value in respect of the correction hold recording elements and setting a density correction value calculated on the basis of the acquired recording density information in respect of recording elements other than the correction hold recording elements;

an image data acquisition step of acquiring image data to be recorded on a recording medium; and an image output step of outputting the acquired image data to a recording medium after carrying out density correction based on the set density correction values for each recording element and recording defect correction based on the measured recording defect information.

14. An image processing method, comprising:

a read data acquisition step of acquiring read image data of a test chart for density measurement for acquiring recording density information indicating a recording density of a plurality of recording elements of a recording head, the test chart for density measurement being output to a recording medium after carrying out recording defect correction on the basis of historical recording defect information indicating existing recording elements having a recording defect, and read image data of a test chart for recording defect detection for acquiring recording defect information indicating recording elements having a recording defect, from among the plurality of recording elements, the test chart for recording defect detection being output to the recording medium;

a density information acquisition step of acquiring recording density information indicating a recording density of the plurality of recording elements, on the basis of read image data of the test chart for density measurement;

a recording defect information acquisition step of acquiring measured recording defect information indicating a recording element having a recording defect, from among the plurality of recording elements, on the basis of read image data of the test chart for recording defect detection;

a correction hold recording element extraction step of identifying a newest recording element having a recording defect on the basis of the historical recording defect information and the measured recording defect information and extracting recording elements that implement recording on the periphery of the newest recording element having a recording defect, as correction hold recording elements; and a density correction value setting step of setting a density correction value for each recording element of the plurality of recording elements, with this density correction value setting step setting a predetermined density correction value in respect of the correction hold recording elements and setting a density correction value calculated on the basis of the acquired recording density information in respect of recording elements other than the correction hold recording elements.

15. A non-transitory recording medium in which computer readable code of an image processing program is stored, wherein the image processing program causes a computer to execute:

a read data acquisition step of acquiring read image data of a test chart for density measurement for acquiring recording density information indicating a recording density of a plurality of recording elements of a recording head, the test chart for density measurement being output to a recording medium after carrying out recording defect correction on the basis of historical recording defect information indicating existing recording elements having a recording defect, and read image data of a test chart for recording defect detection for acquiring recording defect information indicating recording elements having a recording defect, from among the plurality of recording elements, the test chart for recording defect detection being output to the recording medium;

a density information acquisition step of acquiring recording density information indicating a recording density of the plurality of recording elements, on the basis of read image data of the test chart for density measurement;

a recording defect information acquisition step of acquiring measured recording defect information indicating a recording element having a recording defect, from among the plurality of recording elements, on the basis of read image data of the test chart for recording defect detection;

a correction hold recording element extraction step of identifying a newest recording element having a recording defect on the basis of the historical recording defect information and the measured recording defect information and extracting recording elements that implement recording on the periphery of the newest recording element having a recording defect, as correction hold recording elements; and a density correction value setting step of setting a density correction value for each recording element of the plurality of recording elements, with this density correction value setting step setting a predetermined density correction value in respect of the correction hold recording elements and setting a density correction value calculated on the basis of the acquired recording density information in respect of recording elements other than the correction hold recording elements.

* * * * *